US006237114B1

(12) United States Patent
Wookey et al.

(10) Patent No.: US 6,237,114 B1
(45) Date of Patent: May 22, 2001

(54) SYSTEM AND METHOD FOR EVALUATING MONITORED COMPUTER SYSTEMS

(75) Inventors: Michael J. Wookey, Santa Clara; Kevin L. Chu, Palo Alto, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/078,147

(22) Filed: May 13, 1998

(51) Int. Cl.$^7$ ........................................ H02H 3/05

(52) U.S. Cl. ............................... 714/47; 714/57

(58) Field of Search ................. 714/47, 57, 48, 714/54

(56) References Cited

U.S. PATENT DOCUMENTS

| | | | |
|---|---|---|---|
| 4,567,560 | 1/1986 | Polis et al. | 364/184 |
| 4,637,013 | 1/1987 | Nakamura | 370/85 |
| 4,709,365 | 11/1987 | Beale et al. | 371/11 |
| 5,101,402 | 3/1992 | Chiu et al. | 370/17 |
| 5,155,847 | 10/1992 | Kirouac et al. | 395/600 |
| 5,299,312 | 3/1994 | Rocco, Jr. | 395/200 |
| 5,307,354 | 4/1994 | Cramer et al. | 371/11.2 |
| 5,400,246 | 3/1995 | Wilson et al. | 364/146 |
| 5,471,399 | * 11/1995 | Tanaka et al. | 364/491 |
| 5,487,169 | 1/1996 | Vraney et al. | 395/700 |
| 5,491,791 | 2/1996 | Glowny et al. | 395/183.13 |
| 5,495,610 | 2/1996 | Shing et al. | 395/600 |
| 5,539,869 | 7/1996 | Spoto et al. | 395/154 |
| 5,600,796 | 2/1997 | Okamura et al. | 395/200.11 |
| 5,655,081 | 8/1997 | Bonnell et al. | 395/200.32 |
| 5,668,944 | 9/1997 | Berry | 395/184.01 |
| 5,696,486 | 12/1997 | Poliquin et al. | 340/506 |
| 5,699,505 | 12/1997 | Srinivasan | 395/183.07 |
| 5,726,912 | 3/1998 | Krall, Jr. et al. | 364/550 |

(List continued on next page.)

OTHER PUBLICATIONS

Sun Microsystems, "SunVTS 2.1 User's Guide" Revision A, pp. iii–144, Aug. 1997.*
"Remote Systems Diagnosticg Installation & User Guide, Remote Systems Monitoring (SunReMon™), Remote Dial–in Analysis (SunRDA™)," Release 1.0.1, Sun Microsystems, Mountain View, California, Nov. 1996, (116 pages).
"Solstice™ SyMON™ User's Guide," Revision A, Sun Microsystems Computer Company, Mountain View, California, May 1996 (116 pages).

*Primary Examiner*—Dieu-Minh T. Le
(74) *Attorney, Agent, or Firm*—Skjerven Morrill MacPherson LLP

(57) ABSTRACT

A computer system used in monitoring another computer system provides both textual resolution information describing a likely solution for a problem encountered in the monitored computer system as well as component information that relates to the particular problem. The component information includes the various hardware, software and operating conditions found in the monitored computer system. The monitoring computer system determines if a condition of a predetermined severity exists in the monitored computer system according to diagnostic information provided from the monitored computer system. The diagnostic information is represented in the monitoring computer system as a hierarchical representation of the monitored computer system. The hierarchical representation provides present state information indicating the state of hardware and software components and operating conditions of the monitored computer system. The resolution information relating to the condition is retrieved from a resolution database and relevant component information is retrieved from the hierarchical representation of the computer system and presented to a support engineer to assist them in diagnosing the problem in the monitored computer system.

7 Claims, 16 Drawing Sheets

U.S. PATENT DOCUMENTS

| | | | |
|---|---|---|---|
| 5,727,144 | 3/1998 | Brady et al. | 395/182.04 |
| 5,751,964 | 5/1998 | Ordanic et al. | 395/200.54 |
| 5,758,071 | 5/1998 | Burgess et al. | 395/200.5 |
| 5,825,944 | 10/1998 | Wang | 382/309 |
| 5,908,471 | 6/1999 | Lach et al. | 714/805 |
| 5,909,540 | 6/1999 | Carter et al. | 395/182.02 |
| 5,944,839 * | 8/1999 | Isenberg | 714/26 |

* cited by examiner

- CRED Cache
- File Cache
- Streams Message
- Stream Head Cache
- Queue Cache
- SyncQ Cache
- Link Information Cache
- STREvent Cache
- Segment skip list cache
- anonymous cache
- anonymous map cache
- SegVN cache
- FLK Edges
- Snode Cache
- UFS Inode Cache
- FAS Cache
- PRNode Cache
- FNode Cache
- Pipe Cache
- RNode Cache
- RFS Proc control v2
- RFS Req control v2
- ACL Proc control v2
- ACL Req control v2
- ACL Proc Control v3
- ACL Req Control v3
- LM VNode
- LM Xprt
- LM sysid
- LM client
- LM async
- LM sleep
- LM config

*FIG. 7D*

| * Partition | Tag | Flags | Sector | Count | Sector | Mount Directory |
|---|---|---|---|---|---|---|
| c0t0d0s0 | 2 | 00 | 0 | 2048960 | 2048959 | / |
| c0t0d0s1 | 3 | 01 | 2048960 | 262960 | 2311919 | |
| c0t0d0s2 | 5 | 00 | 0 | 4154160 | 4154159 | |
| c0t0d0s7 | 8 | 00 | 2311920 | 1842240 | 4154159 | /export/home |

| * Partition | Tag | Flags | Sector | Count | Sector | Mount Directory |
|---|---|---|---|---|---|---|
| c0t1d0s0 | 2 | 00 | 0 | 62320 | 62319 | /c0t1d0s0.a005WN |
| c0t1d0s1 | 3 | 01 | 62320 | 197600 | 259913 | |
| c0t1d0s2 | 5 | 01 | 0 | 4154160 | 4154159 | |
| c0t1d0s0 | 4 | 00 | 259920 | 3894240 | 4154159 | /c0t1d0s6.a005WN |

*FIG. 8*

SYSTEM AND METHOD FOR EVALUATING MONITORED COMPUTER SYSTEMS

CROSS-REFERENCE TO RELATED APPLICATIONS

This application relates to the following commonly owned co-pending applications, Ser. No. 08/819,500, entitled "DYNAMIC TEST UPDATE IN A REMOTE COMPUTER MONITORING SYSTEM", by Michael J. Wookey, filed Mar. 17, 1997; Ser. No. 08/819,501, now U.S. Pat. No. 6,023,507, entitled "AUTOMATIC REMOTE COMPUTER MONITORING SYSTEM", by Michael J. Wookey, filed Mar. 17, 1997; Ser. No. 08/829,276, entitled "REBUILDING COMPUTER STATES REMOTELY", by Michael J. Wookey; Ser. No. 08/854,788, entitled "REMOTE ALERT MONITORING AND TREND ANALYSIS", by Michael J. Wookey et al., filed May 12, 1997; Ser. No. 08/861,141, "AUTOMATIC BUILDING AND DISTRIBUTION OF ALERTS IN A REMOTE MONITORING SYSTEM", by Michael J. Wookey et al., filed May 21, 1997, which applications are incorporated herein by reference.

BACKGROUND OF THE INVENTION

1. Field of the Invention

This invention relates to monitoring of computer systems and more particularly to providing system support to resolving serious problems detected when monitoring remote computer systems.

2. Description of the Related Art

Computer systems such as mainframes, minicomputers, workstations and personal computers, experience hardware and software failures that degrade system performance or render the system inoperative. In order to diagnose such failures computer systems include diagnostic capability which provides various types of system diagnostic information.

Computer systems are typically serviced when a failure is noticed either by system diagnostics or by users of the system when the system becomes partially or completely inoperative. Since computer systems are frequently located at some distance from the support engineers, when problems do occur, a support engineer may access the computer system remotely through a modem in an interactive manner to evaluate the state of the computer system. That remote dial-in approach does allow the support engineer to provide assistance to a remote customer without the delay of traveling to the computer system site. Once connected to the remote computer system, the support engineer can perform such tasks as analyzing hardware and software faults by checking patch status, analyzing messages file, checking configurations of add-on hardware, unbundled software, and networking products, uploading patches to the customer system in emergency situations, helping with problematic installs of additional software, running on-line diagnostics to help analyze hardware failures, and copying files to or from the customer system as needed.

However, there are limitations to such support. For instance, the data size transfer may be limited at the time of failure, due to such factors as modem speed and thus a complete picture of a system may be unavailable. Running diagnostic software during the remote session, if necessary, may adversely impact system performance. Where a system is part of a network, which is commonplace today, the running of diagnostic tests may impact network performance. Where computer systems are being used in a production or other realtime environment, such degradation of system performance is obviously undesirable.

System diagnostic tests typically generate a significant amount of data and it can be difficult for a support engineer to analyze such data in a raw form. Therefore, there is a need to provide the support engineer with help in diagnosing and correcting problems indicated by the raw data.

SUMMARY OF THE INVENTION

Accordingly, the present invention provides assistance to the support engineer in evaluating monitored computer systems by providing both textual resolution information describing a likely solution for the problem as well as component information that relates to the particular problem. The component information includes the various hardware, software and operating conditions found in the monitored computer system.

In one embodiment, the invention provides a method of monitoring a computer system, which includes determining if a condition of a predetermined severity exists in the monitored computer system according to diagnostic information provided from the monitored computer system. The diagnostic information is included in a hierarchical representation of the monitored computer system. The hierarchical representation provides present state information indicating the state of hardware and software components and operating conditions of the monitored computer system. The resolution information relating to the condition is retrieved from a first storage location and component information from the hierarchical representation of the computer system relating to the condition is retrieved from a second storage location.

In another embodiment, the invention provides a computer system for monitoring a monitored computer system. The computer system includes a first storage location storing at least a first host state representing a state of the monitored computer system during a first time period. The first host state is in a tree structure that includes component information which represents hardware and software components and operating conditions of the monitored computer system. The component information is extracted from diagnostic data provided from the monitored computer system. A second storage location stores information providing a description of known problems and resolutions. A third storage location stores a first program code segment which is run against the host state to identify a predetermined condition in the host state. A fourth storage location stores a second program code segment which retrieves resolution information from the second storage location relating to the predetermined condition and retrieves component information relating to the predetermined condition.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIG. 1b shows an exemplary monitored computer system which runs diagnostic tests on each computer and communicates the results of those tests to the system of FIG. 1a.

FIG. 7d shows operating system elements related to kernel statistics.

FIG. 8 shows an exemplary output of a diagnostic test from which tokens are extracted and used to instantiate the static model exemplified by FIGS. 3–6 and FIGS. 7a–7e.

DESCRIPTION OF THE PREFERRED EMBODIMENT(S)

Figure 1A:
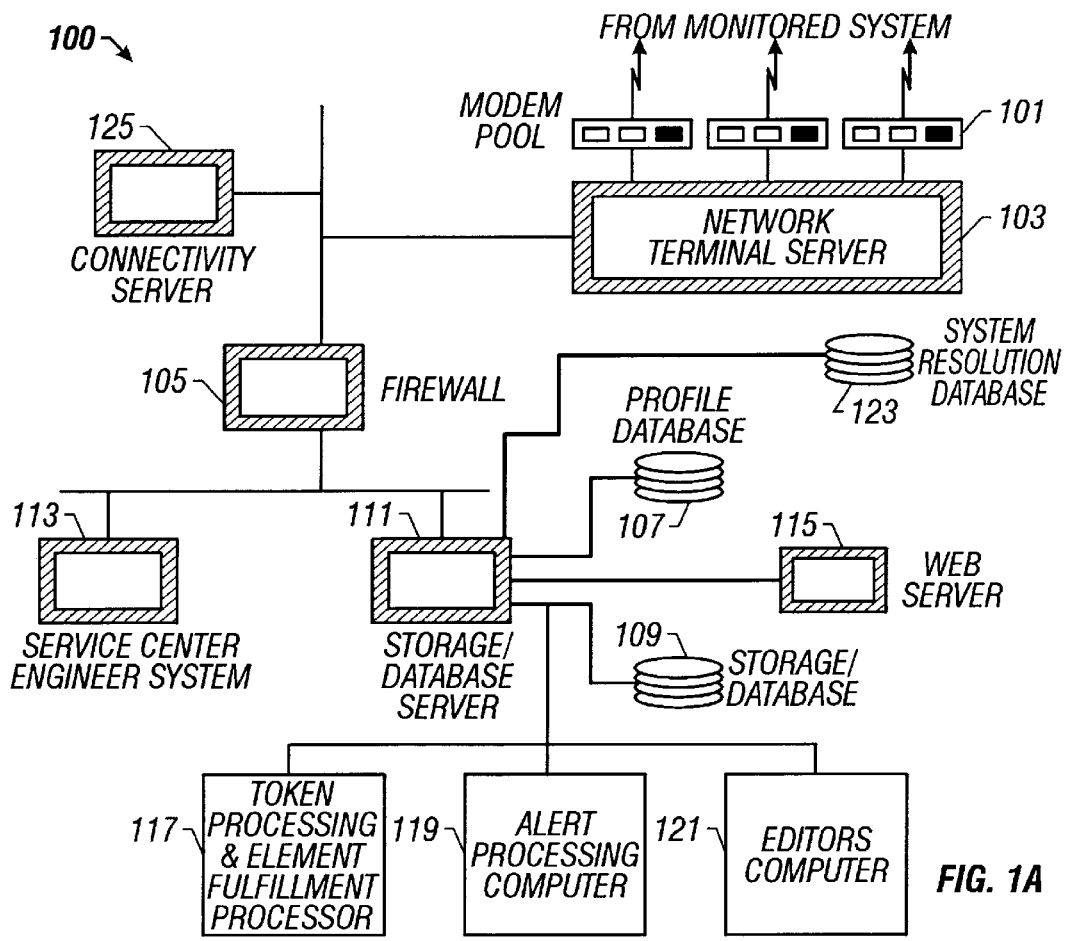
FIG. 1a shows an exemplary system for rebuilding the state of a computer system.
Figure 1B:
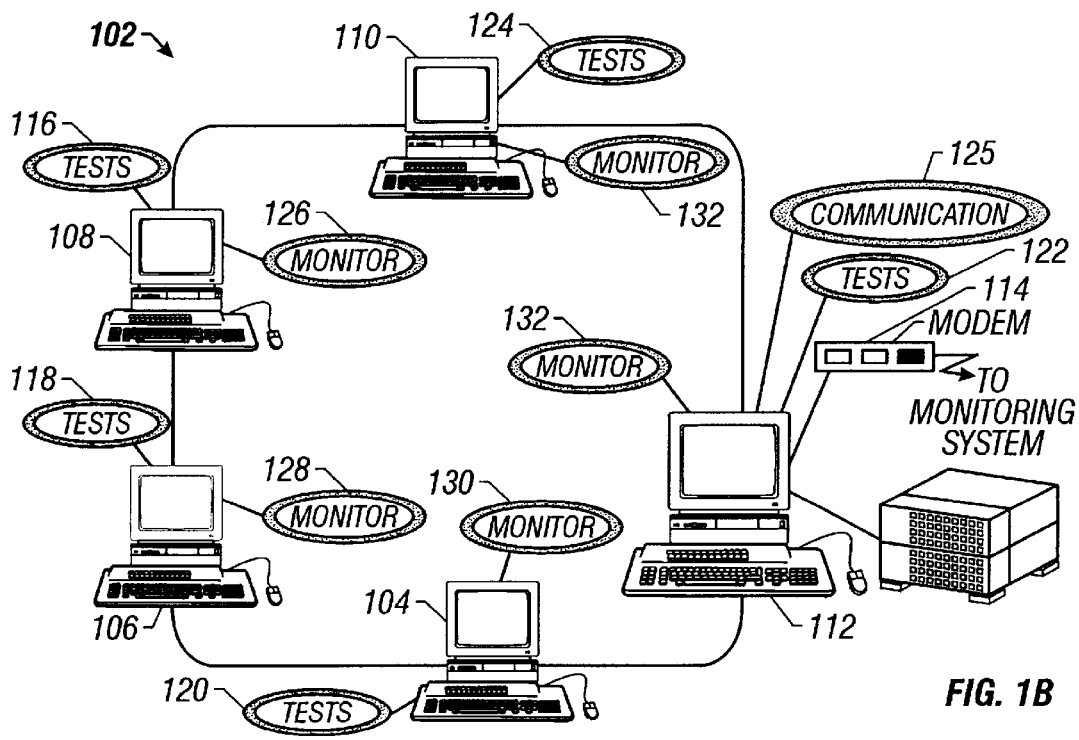

Referring to FIGS. 1a and 1b, an exemplary computer system 100, receives diagnostic data from a monitored computer system 102. Monitored computer system 102 runs diagnostic tests on a periodic basis. Exemplary tests are shown in Table 1 and Table 2. The monitored system includes at least one computer and typically includes a plurality of computers 104, 106, 108, 110, and 112 coupled in a network as shown in FIG. 1b. The diagnostic tests 116, 118, 120, 122, and 124 are run on the computer system 102 under the control of monitor control software 126, 128, 130, 132, and 134. The results of those diagnostic tests are automatically provided at periodic intervals to the computer system 100 which monitors computer system 102.

Exemplary computer system 100 which is consistent with the present invention, includes one or more computers and associated storage areas, preferably coupled in a network Computer system 100 receives incoming diagnostic data from monitored system 102 from modem 114 at one of the modems in the modem pool 101. The incoming data may be received via email or may be a direct modem connection to the monitored system 102 or may be received via other communication channels such as wireless. The raw diagnostic data is stored in storage 109. Storage 109 is shown as a single storage unit but may be separate storage units to accommodate the various storage requirements described herein. In order to perform operations on the data received, token processing and element fulfillment processor 117 transforms the received incoming data into a structure which can then be analyzed by alert processing computer 119.

Editing capability is provided by a separate computer 121. Note that the functions may be performed in separate machines or may be combined into one or several computers.

TABLE 1

| Class | Test Name | Description |
|---|---|---|
| network | automount.files | Automount/etc Files |
| | automount.nis+ | Automount NIS+Files |
| | automount.nis | Automount NIS Files |
| | dfshares | NFS shared filesystems |
| | domainname | Domain name |
| | etc.defaultdomain | /etc/defaultdomain |
| | etc.defaultrouter | /etc/defaultrouter |
| | etc.dfstab | List/etc/dfs/dfstab |
| | etc.hostnames | /etc/hostname(s) |
| | etc.hosts | /etc/hosts |
| | etc.mnttab | List/etc/mnttab |
| | etc.named.boot | /etc/named.boot |
| | etc.nsswitch.conf | /etc/nsswitch.conf |
| | etc.resolv.conf | /etc/resolv.conf |
| | netstat-an | List all TCP connections |
| | netstat-in | List network interfaces |
| | netstat-k | Network interface low-level statistics |
| | netstat-rn | List network routing |
| | nisdefaults | NIS+ server defaults |
| | nisstat | NIS+ statistics |
| | ypwhich | NIS server name |
| | ypwhich-m | NIS map information |
| OS | checkcore | Check for core files |
| | df | Disk Usage |
| | dinesg | Boot Messages |
| | framebuffer | Default console/framebuffer |
| | hostid | Numeric ID of host |
| | ifconfig | Ethernet/IP configuration |
| | messages | System messages (/var/adm/messages) |
| | patches | List system patches |
| | pkginfo | Software package information |
| | prtconf | System hardware configuration (Software Nodes) |
| | prtconf-p | System hardware configuration (PROM Nodes) |
| | prtdiag | Print diagnostics (Sun-4d systems only) |
| | sar | System activity reporter |
| | share | Shared directories |
| | showrev | Machine and software revision information |
| | swap | Swap report |
| | uptime | Local uptime and load average |
| | whatami | Lengthy system description report |
| unbundled | fddi-nf_stat | FDDI low-level statistics |
| | metastat | Online DiskSuite or Solstice DiskSuite |
| | vxprint | Systems using SPARCstorage Array Volume Manager |
| | x25_stat | X.25 low-level statistics |

TABLE 2

| Test Name | Test Name |
|---|---|
| ps -ef | ypwhich |
| pkginfo -1 | df |
| vmstat | df-k |
| showrev -a | mount -v |
| xdpyinfo | more /etc/dfs/dfstab |
| netstat -k | cachefsstat |
| kmemleak (SMCC) | df-1 |
| vtsprobe | df-1k |
| modinfo | showrev -p |
| arp -a | nettest -1v (VTS) |
| netstat -r | dmesg |
| configd | diskprobe |
| more /etc/mail/sendmail.cf | disktest -1v (VTS) |

TABLE 2-continued

| Test Name | Test Name |
|---|---|
| crontab -1 (as root) | tapetest -1v (VTS) |
| more /etc/nsswitch.conf | bpptest -1v (VTS) |
| more /etc/resolv.conf | uname -a |
| niscat -o org_dir | |

Figures 2, 2A:
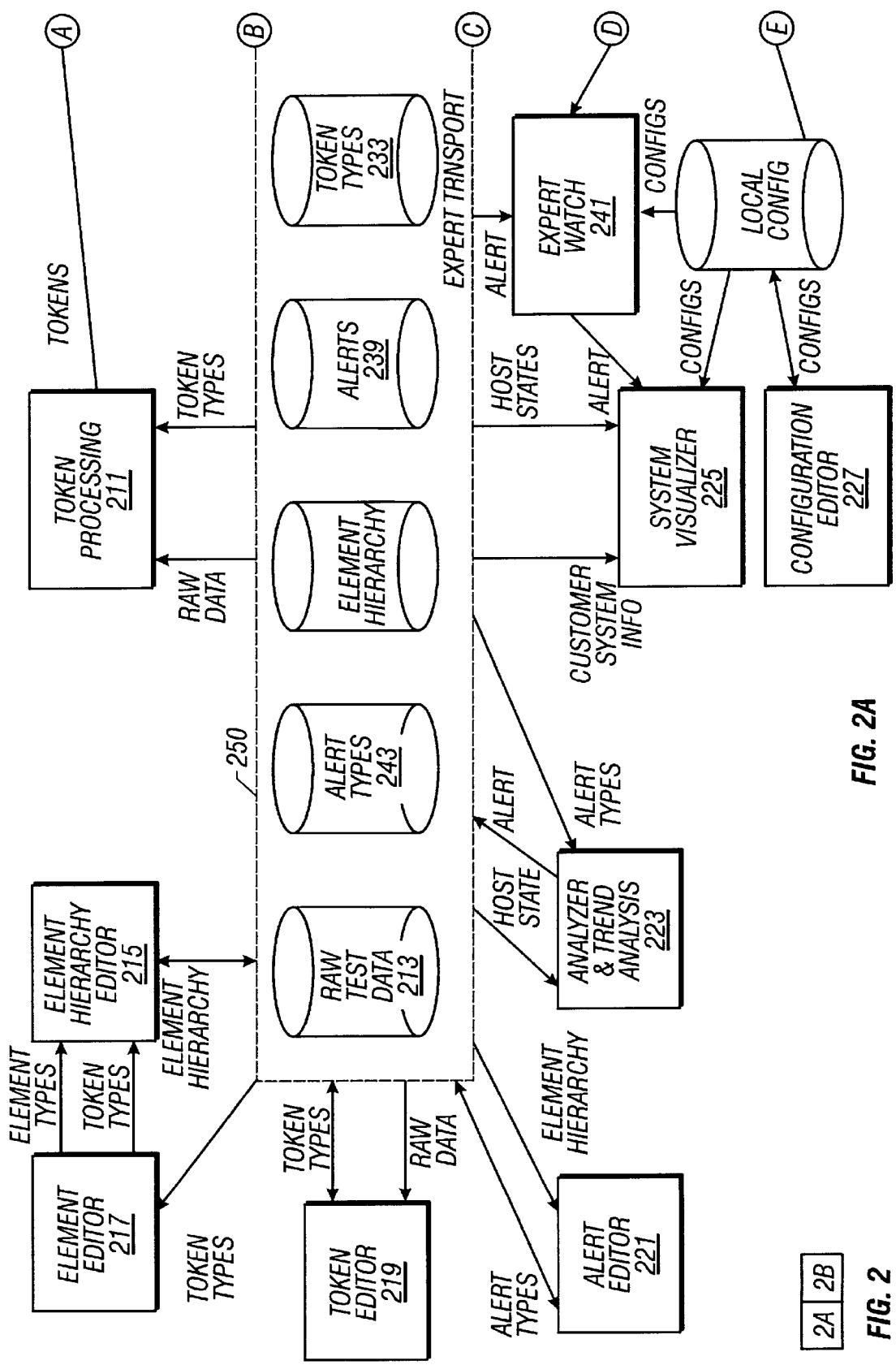
FIG. 2 details the architecture of a system that rebuilds computer states.
Figure 2B:
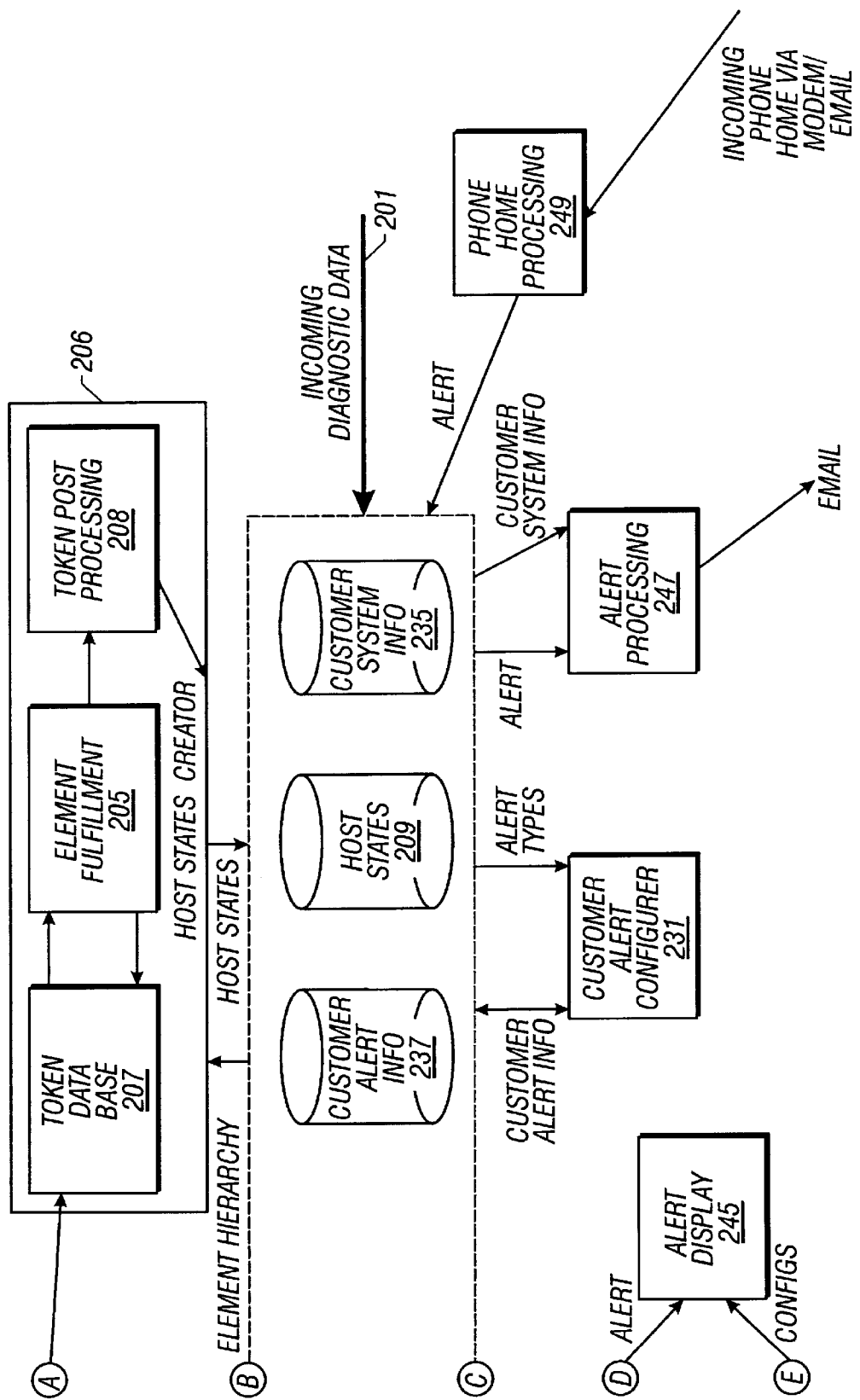

Referring to FIG. 2, the architecture of a system according to one embodiment of the present invention, is shown in greater detail. Incoming diagnostic data 201 is received via email or direct modem link (or another communication link) into the monitoring system and stored in raw test data storage area 213. The test data, which contains information about the software and hardware components in monitored system 102, is processed by token processing 211 to extract the information associated with hardware and software components in the monitored system. The extracted information is then used to create a representation of the monitored system in host state creator 206 based on the component information. The host state is the state of the monitored system or one computer of the monitored system over the particular time period that the diagnostic tests were run. The host state is described further herein.

In order to create a representation of the monitored system, the components contained in the test data are rebuilt into a system hierarchy based on a static hierarchy tree definition. In a preferred embodiment, one static hierarchy tree definition is applicable to all systems which are being monitored. The extracted information about the components in the monitored system are mapped onto the static tree to create the system representation for the monitored system. Thus, the state of the monitored system is rebuilt.

The hierarchy tree is composed of elements. An element can be thought of as a physical or virtual component of a computer system. For example, a computer system may include such components as a disk, a disk partition, a software package, and a software patch. An element has tokens associated with it. Thus, a disk partition element may have a disk percentage token, disk name token, and space available token associated with it. An element definition includes what token types fulfill the element, and give the element value. In one embodiment, an element is an instance of a class of element types as implemented in an object oriented language such as the Java™ programming language. Java and Java-based trademarks are trademarks or registered trademarks of Sun Microsystems, Inc. in the United States and other countries.

Figure 3:
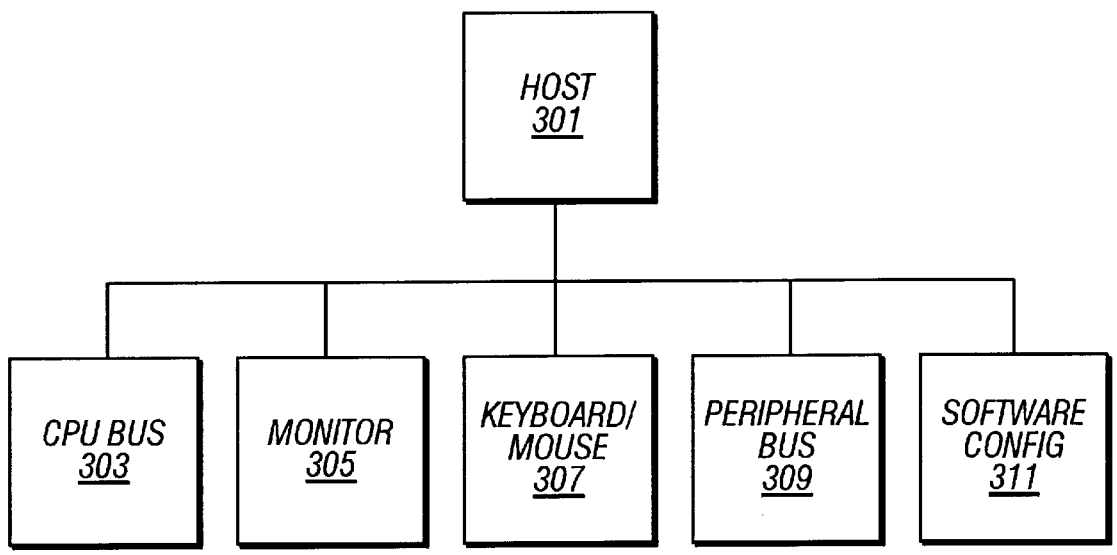
FIG. 3 shows a root and lower branches of a static tree definition of computer system.
Figure 4:
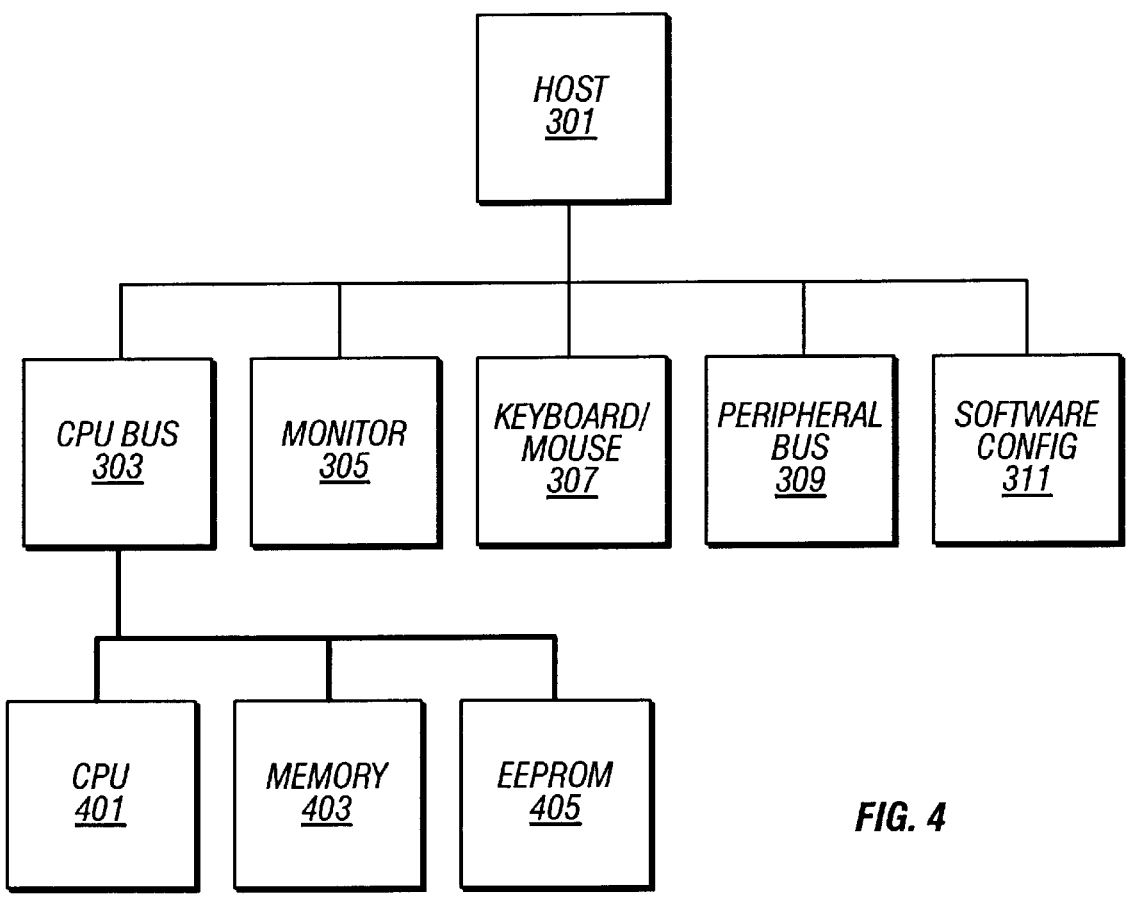
FIG. 4 shows additional branches of a static tree definition of a computer system related to components on the CPU-BUS.
Figure 5:
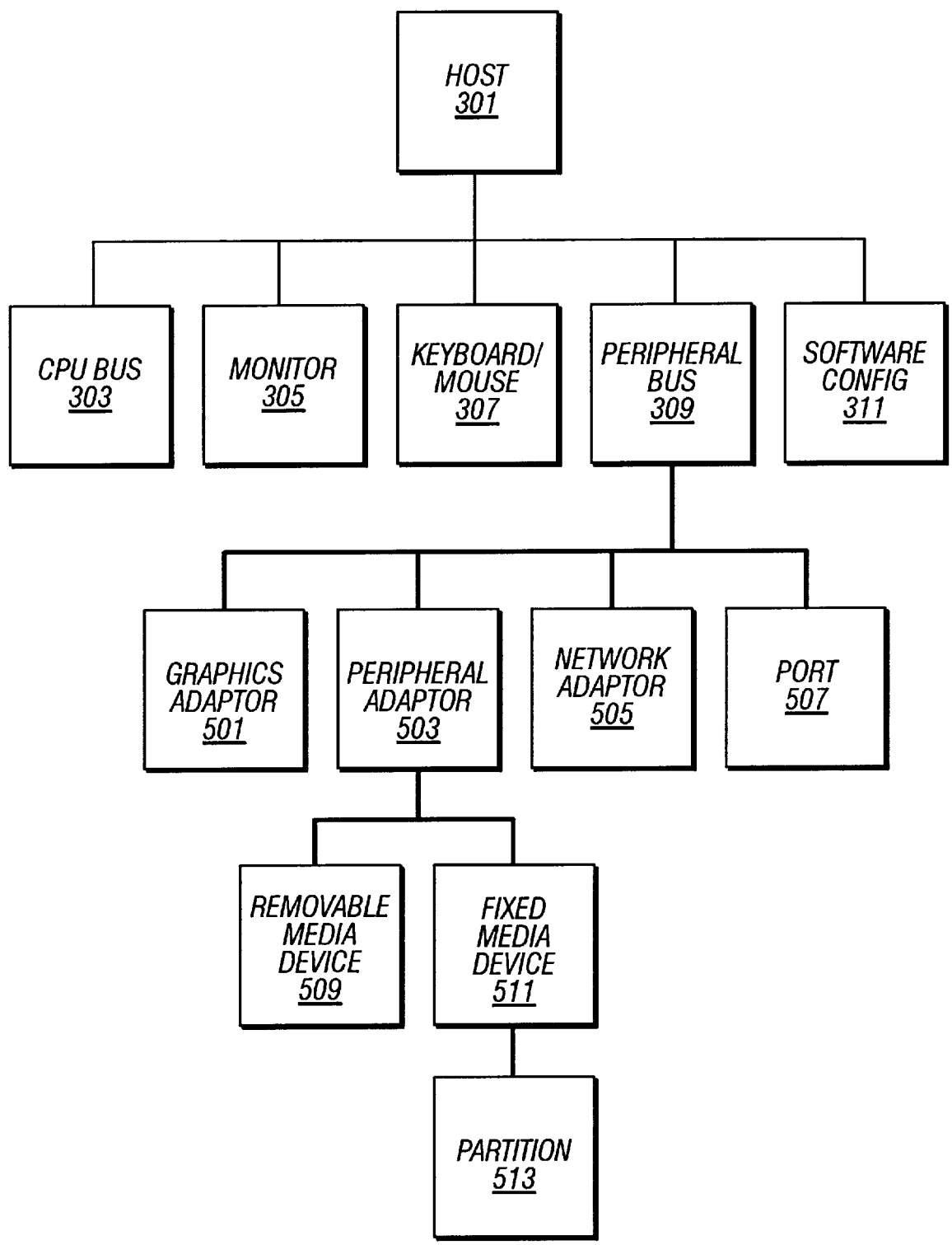
FIG. 5 shows additional branches of a static tree definition of a computer system, related to components on the peripheral bus.
Figure 6:
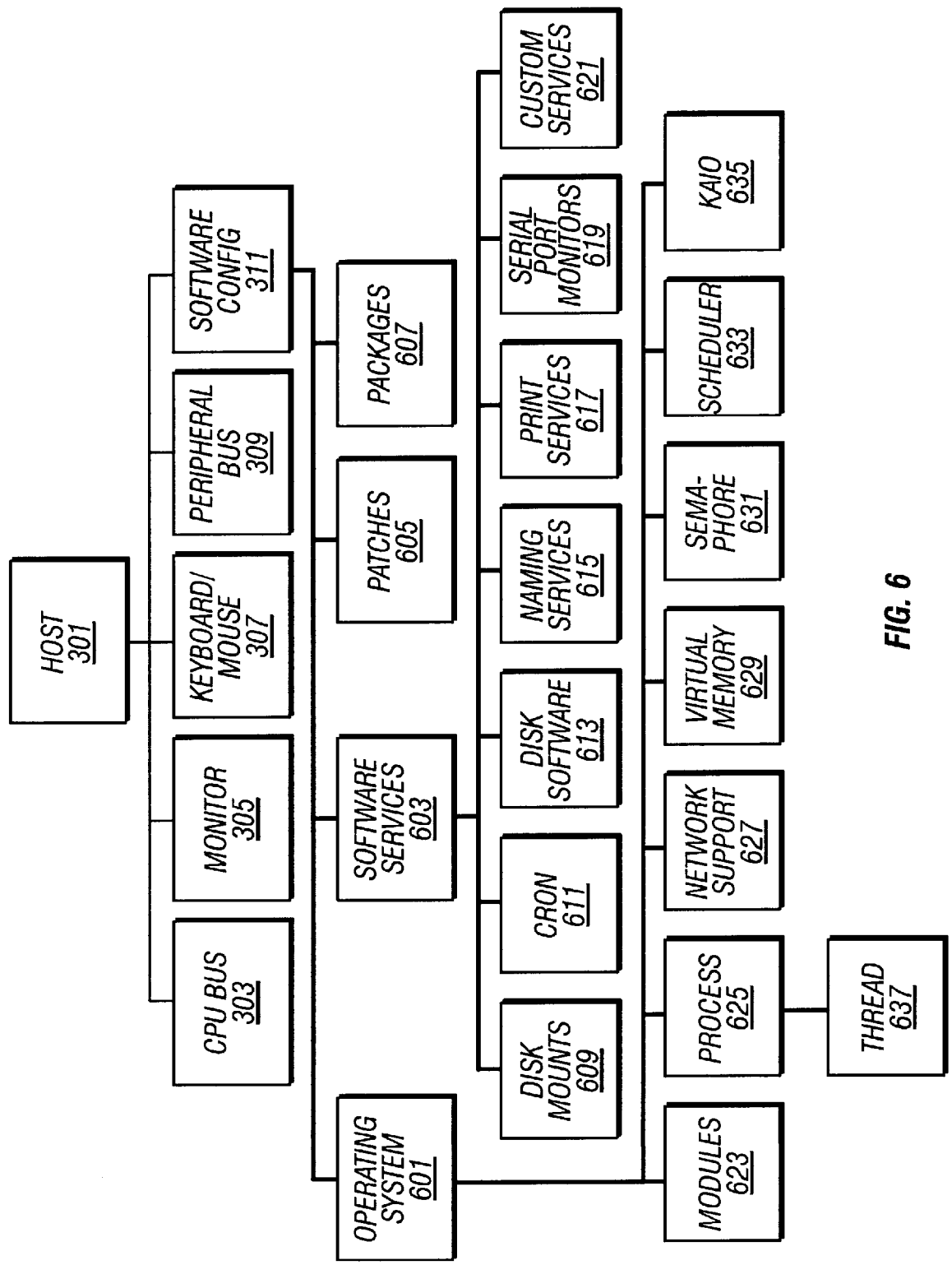
FIG. 6 shows additional branches of a static tree definition of a computer system, related to software configuration components.
Figure 7A:
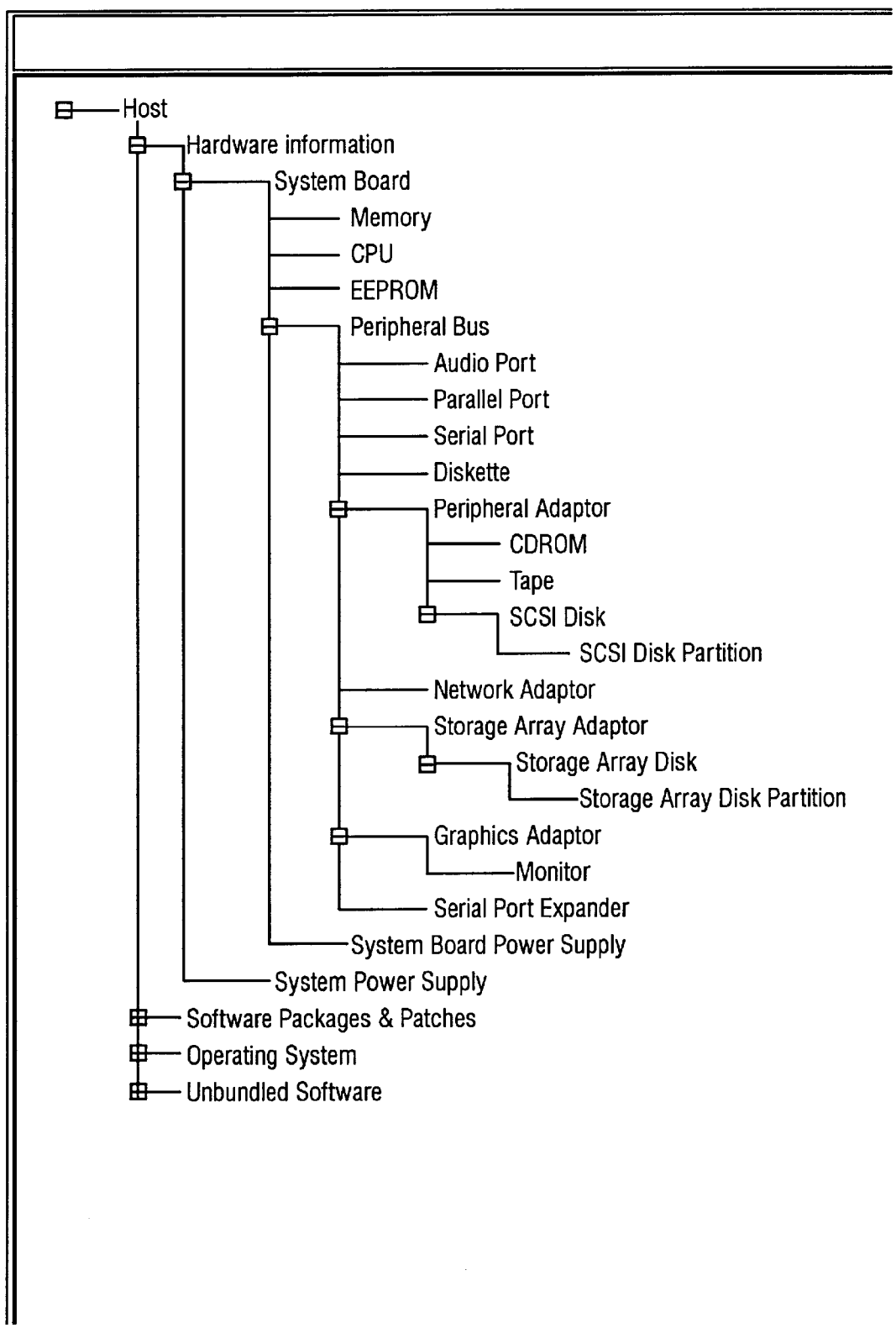
FIG. 7a shows the root and lower branches of a second exemplary tree structure.
Figure 7B:
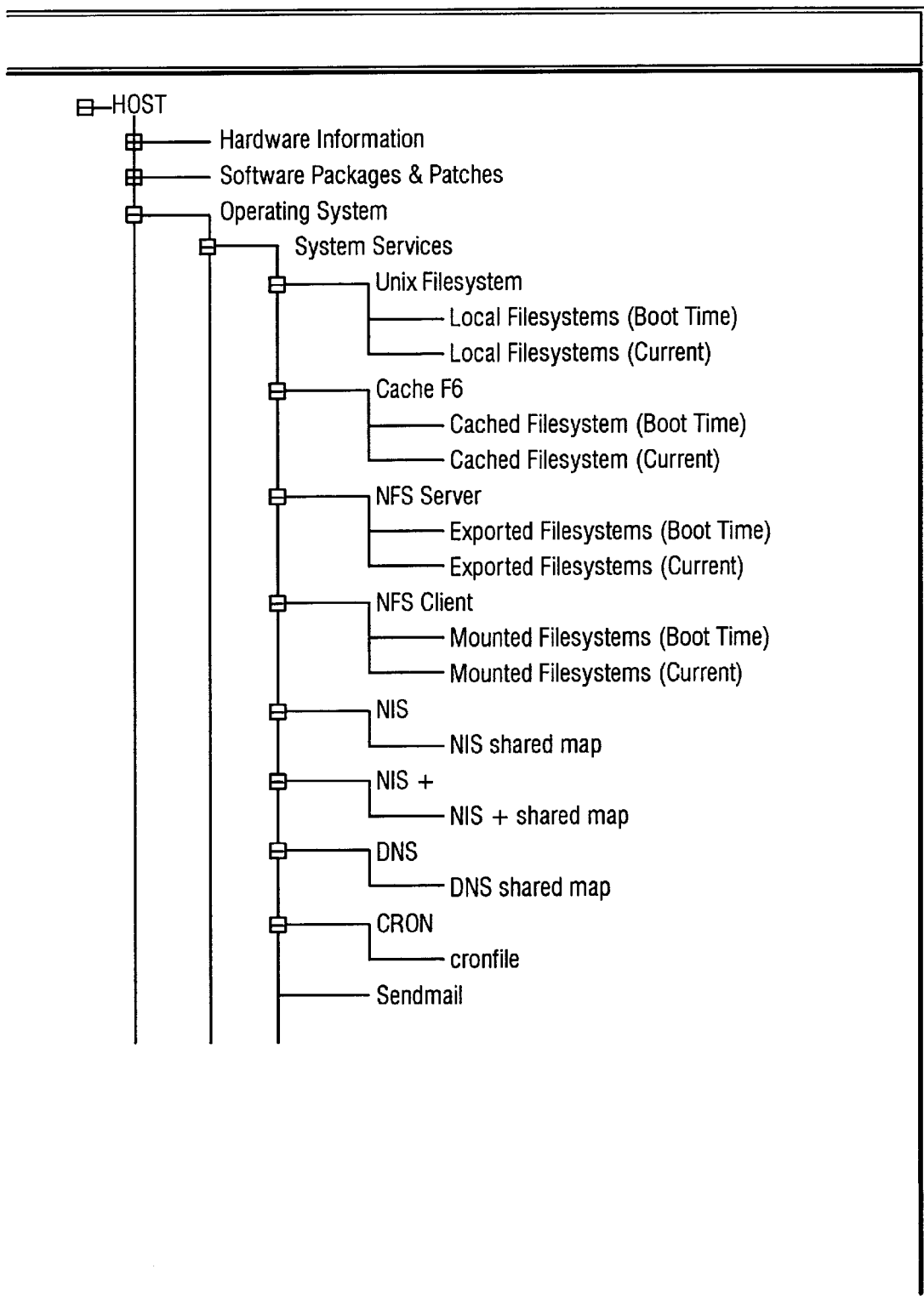
FIG. 7b shows additional sub elements of the System services element.
Figure 7C:
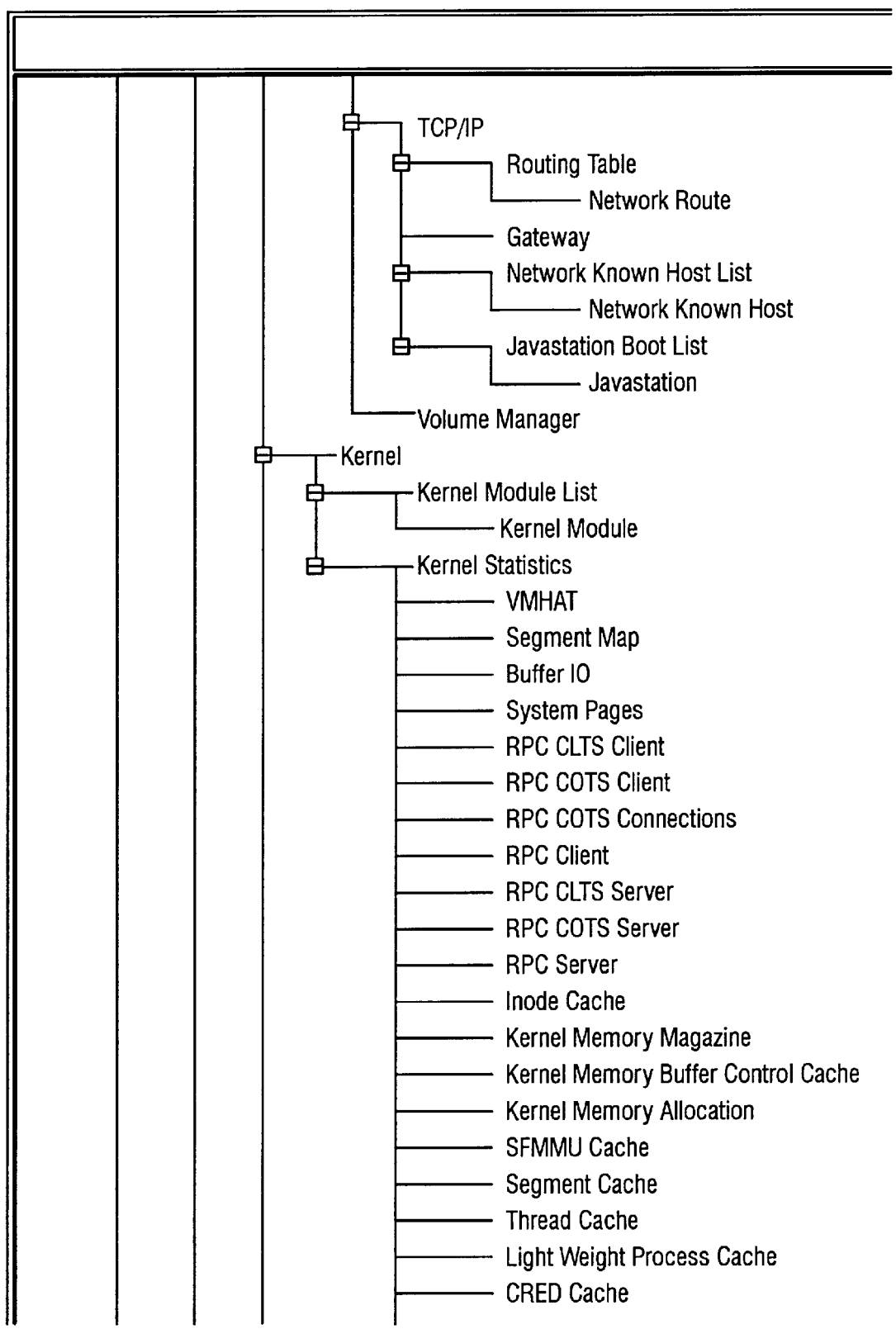
FIG. 7c shows additional operating system elements.
Figure 7E:
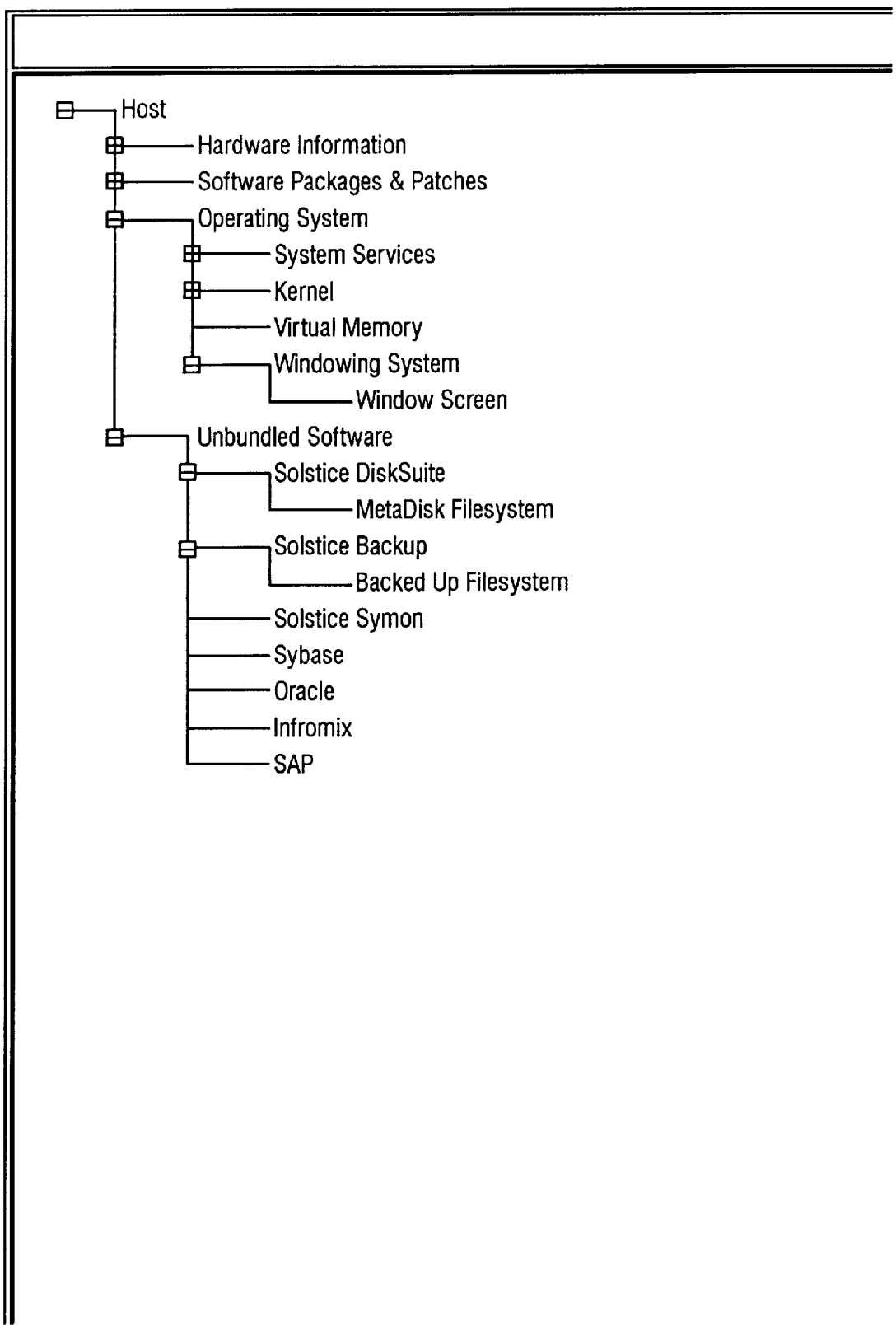
FIG. 7e shows unbundled software elements.

An exemplary portion of a static tree definition a computer system is shown in FIGS. 3–6. FIG. 3 shows lower level (closer to the root) elements of the static tree and FIGS. 4, 5 and 6 show how the tree definition expands. The element host 301 defines the kind of computer that is being monitored. For instance, the host may be a workstation running an operating system such as Solaris™ (which is a trademark or registered trademark of Sun Microsystems, Inc. in the United States and other countries) or a personal computer running another operating system such as WINDOWS NT (WINDOWS NT is a trademark of Microsoft Corporation). Attached to host 301 are other physical or virtual components such as central processing unit (CPU) bus 303, monitor 305, keyboard/mouse 307, peripheral bus 309 and software configuration 311. Note that the terms are very general. Each element represents types of components that can be found in a typical computer system.

Referring to FIG. 4, the computer system further includes additional physical or virtual components on the CPU bus 303. The additional elements found on the CPU bus include CPU 401, memory 403 and EEProm 405. Referring to FIG. 5, additional components of the static hierarchy tree definition of the computer system can be found under peripheral bus element 309. Note that the instance of the peripheral bus may be an SBUS. However, the instance may also be a Peripheral Component Interface (PCI) bus. In fact there may be two instances of peripheral bus, SBUS and PCI bus. In some instances there may be more than two peripheral buses.

Referring to FIG. 5, the additional elements found on peripheral bus 309 include graphics adaptor 501, peripheral adapter 503, network adapter 505 and port 507. The peripheral adapter element 503 may be coupled to additional elements such as removable media device element 509, (e.g., a disk drive, tape or CD drive) or a fixed media device 511. The fixed media device may be a hard disk drive which can have a further virtual component, partition element 513. Note the general nature of the static hierarchy system definition. That allows the static definition to be used even for monitored systems that utilize different software and hardware components.

Referring to FIG. 6, additional software elements under the software configuration element 311 are shown. Included in the software configuration 311 are the operating system (OS) element 601, software services element 603, patches element 605 and packages element 607. Additional elements under software services include disk mounts 609, cron 611, disk software 613, naming services 615, print services 617, serial port monitors 619 and custom services 621. The packages element 607 indicates, e.g., what software has been installed on the system. The operating system 601 is further defined by elements 623–637. Such elements are known in the art and not discussed further herein. The elements described in FIGS. 3–6 are exemplary and will depend on the computer system being monitored.

The description of the static tree is exemplary. Another tree may be chosen according to the system being monitored. Additionally, the static tree may be modified to reflect hardware and software enhancements to computer systems. The hierarchy tree definition is static in that it does not vary according to the system being monitored. However, the hierarchy tree can be edited in element hierarchy editor 215 to accommodate additions and/or deletions from the hierarchy tree when for instance, a new technology begins to be utilized in the monitored computer systems. One static tree or hierarchy tree definition may be sufficient for most or all monitored systems. However, a hierarchy tree definition may be tailored to the type of computer system that is being monitored to e.g., enhance processing speed. Another exemplary tree structure is shown in FIGS. 7a–7e. The tree structure can be seen to include both hardware components and software components.

Thus, given a static definition of a generic computer system such as shown in FIGS. 3–6, or FIGS. 7a–7e, it is possible to build a representation of the actual computer system being monitored utilizing the diagnostic data communicated from the monitored system to the monitoring system.

In order to extract information from the diagnostic data stream, "token types" are utilized. A token type defines each token to have a token name and a test name. A test name comes from the tests shown e.g., in Table 1 or in Table 2, and indicates which test output contains the information for the token. In addition to a token name and a test name, each token has a label and a value. The label for the token gives the token knowledge about what element the token is associated with, i.e., the parent of the token which is an element. The value of the token provides a value extracted from the diagnostic data that gives value to the element.

For instance, assume a disk element exists with a name of "c0t10d0". Assume also that a token exists for such a disk element indicating the number of sectors per cylinder. The name of such a token is, e.g., "number of sectors per cylinder." The test name in the token is "vtsprobe" since the output of that test provides the information needed for the number of sectors per cylinder. The label for the token is "c0t10d0" indicating that token is associated with a particular disk having that name. Finally, the token has a value which indicates the number of sectors per cylinder. Other tokens may of course be associated with that element. For example, another token associated with that disk element might be a disk manufacturer token that identifies the manufacturer as "Seagate". The value of the token in such an instance is "Seagate".

Note that one token type can create many tokens from the test data. For example, a "disk name" token type may extract multiple tokens, e.g. the disk names "c0t1d0" and "c0t2d0", from the test data when a particular system has two disks so named.

There are two types of tokens. The first is an element realizing token. Element realizing tokens provide a way to determine whether an element should be included when building a particular host state. For example, a disk name token is an element realizing token. The second type of token are data tokens which provide additional information about an element that has already been realized, such as the token indicating the number of sector per cylinder. Thus, it can be seen that tokens give value to the elements.

For any particular system, it is preferable to create tokens with as much granularity as possible. Thus, the smallest piece of information that is available about a system from the available diagnostic tests should be included as a token. Representative tokens are included in the description herein. The exact nature of the tokens and the total number of tokens will depend upon the system that is being monitored, including its hardware and operating system, and the diagnostic tests that can be run on the system. An exemplary output of one the diagnostic tests is shown in FIG. 8. The processing must extract from the output such information as the disk partition ID, last sector, first sector and the like.

Further example of elements, tokens and associated test are found in application Ser. No. 08/829,276, entitled "REBUILDING COMPUTER STATES REMOTELY", previously incorporated herein by reference.

Note that the embodiment described herein uses an object oriented computer language. One further embodiment uses the Java programming language. Nearly all the classes and type definitions described herein extend the type Persistent Object found in the Java programming environment. Persistence is a technique that can be used in object oriented programming to ensure that all memory resident information can be stored to disk at any time. It can be thought of as encoding and decoding. When a persistent object is saved to disk, it is encoded in some manner so that it may be efficiently stored in the appropriate medium. Equally when loading the information back, it is decoded. That allows complex memory structures to be stored easily in databases with minimum disk space impact.

Now that it is understood that a static tree structure is composed of elements which are realized and given value by tokens, the building of a particular representation of a monitored computer system can be more completely described. Referring again to FIG. 2, the incoming data stream 201 of diagnostic data is stored in raw test data storage area 213. Token types are stored in storage area 233. The token types and the diagnostic data are provided to token processing 211, which is the process of running the token definitions against the incoming data (which may be implemented by running the incoming data against the tokens) and generating an outgoing stream of tokens which are stored in token data base 207. In one embodiment the tokens in token data base 207 are stored as a hashtable to provide faster access to subsequent processing steps of building the representation of the system. A hashtable is a common key/element pair storage mechanism. Thus, for the token hashtable, the key to access a location in the hashtable is the token name and the element of the key/element pair is the token value. Note that because the diagnostic data may include data for multiple computers in a monitored network or subnetwork, one task is to separate the diagnostic data provided to the token processing process 211 according to the computer on which the diagnostic tests were executed. Token types are run against the test output indicated in the test name in the token. For example token types having a test name parameter of "df" are run against "df" test output.

Once all the raw test data has been processed and completed token data in available in token data base 207 is available, the second set of processing operations to build the representation of the monitored computer may be completed. In order to understand the building of the tree, an examination of several typical features of an element class will provide insight into how an element is used to build a tree.

An element has methods to retrieve the name of the element as well as the various values associated with an element. For example, a disk element includes a method to retrieve a disk ID token which realizes the element as well as having a method to find in the token data base a disk capacity parameter, sectors per track and associated other tokens. Those parameters are used to realize a disk element and give it value.

An element of one type is similar to an element of another type. For example, a partition element requires different tokens to provide different values but otherwise is similar to a disk element. The tokens needed to provide value to the partition element may include partition size, partitions used and partition free. Note that elements have associated tokens providing a name or ID. As previously described, tokens have both a value and a label. The label or name provides a "tie" for the token. Suppose a disk element is instanced with a name of "c0t1d0". One of its token to be fulfilled is disk size. The token that provides the disk size would have a name of "c0t1d0" and a value of 1.2 Gb. The value of 1.2 Gb is tied to the name "c0t1d0".

Figure 9:
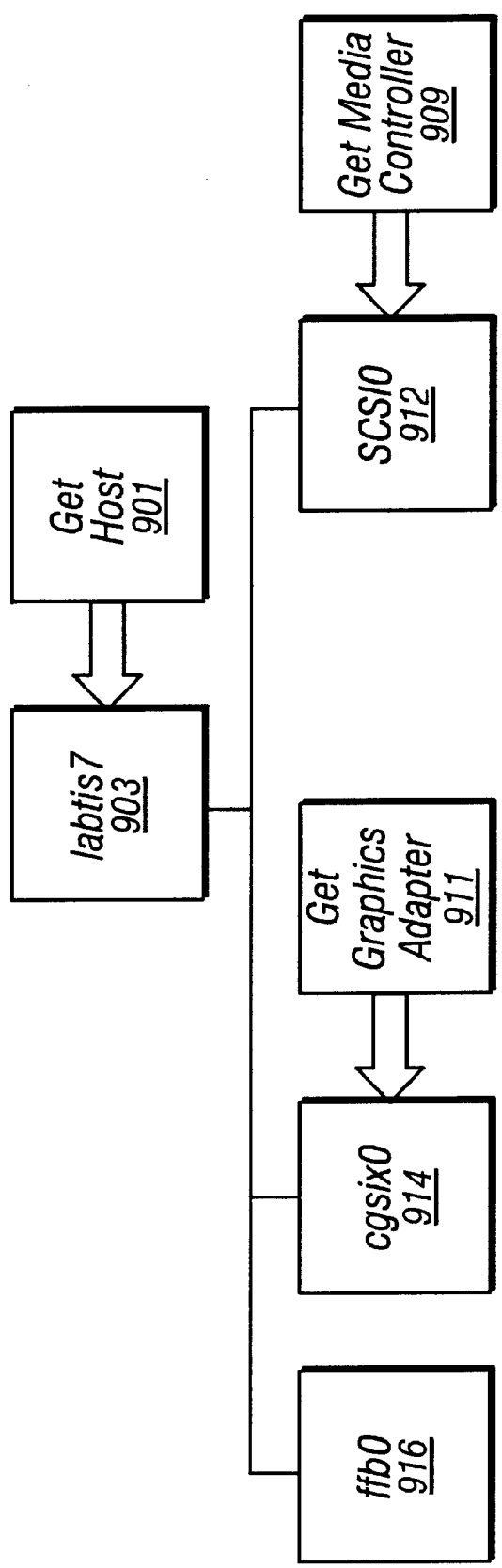
FIG. 9 shows an exemplary instantiation of a portion of a static tree.

Referring to FIG. 9, an example of building a host state based on the elements of the static tree is shown. The term "host state" refers to the representation of the monitored system based on its diagnostic data. The host state essentially describes the state of a system for a given time period. The host state may be viewed as an instantiated element hierarchy based on the raw data that has come in from the remote host. In other words, it is a completed element hierarchy with value. The diagnostic data is collected over a particular time period, so the host state represents the state of the monitored machine over that particular time period, e.g., an hour. The host state is built by starting from the top of the tree element host 301 (shown in FIG. 3). The element 301 has Get Host method 901 to retrieve relevant tokens from the token data base 207. As shown in FIG. 9, the element 301 is realized as "labtis 7" 903. Because the token data base is a hashtable in the preferred embodiment, the realization of each element is faster. Next element graphics adapter 501 (FIG. 5) gets graphics adapter designated as cgsix0 914 and ffb0 916 using Get graphics adapter method 911. Continuing to build the host state, media controller element gets SCSI0 912 from token data base 207. In a preferred embodiment, the host state is built in depth order meaning that each element and all branches of that element are built before another element is built. Thus, referring back to FIG. 5, for example, everything on peripheral bus 309 is built before the building of the software configuration 311. For each element in the static tree, the token data base 207 is searched and the host state is created in element fulfillment processing 205 which requests tokens from token data base 207 in the form of searches for tokens providing realization and value to the static tree.

Once the element fulfillment stage is completed a final token post processing operation takes place in 208. An element can have a token defined that is the mathematical result of other tokens. For example, a disk space free token is derived from a simple subtraction from a disk used token and a total disk space token. The calculations are completed in this post processing operation 208 to complete the host state.

Note that because the tree definition is static and is intended to be general, not all elements will be found in every host state. Thus, when building the host state, no data will be found in the token data base for a particular element that is lacking in the monitored system. Additionally, in some host states, an element will be found more than once. Thus, the tree structure provides the flexibility to build host states that look very different.

Once the host state is built, it is saved in host states storage 209. The storage of the host state provides several advantages. For one, it provides the capability to search back through time and to compare one host state with another host state from a different time or perform trend analysis over time. The host states may be stored for any amount of time for which adequate storage area is available. For example, host states may be stored for a year.

Additionally, the stored host states are used when the diagnostic data is incomplete. There may be occasions when a test has failed to run in the monitored system or has not run before a scheduled communication of data from the monitored system. That may cause problems in the building of the host state from the static tree, especially where the test was one that created elements lower in the tree (i.e. towards the root). Each element can include a value that indicates how critical the element is to the system. If the element is critical, such as a disk, there may be a problem with the system and it should be noticed. If the data is not critical to the system, then older data may be retrieved from the previous host state in time for that particular host. That may be limited by restricting such retrieval to a specified number of times, e.g., 10, or any other number appropriate to the criticality of the element, before marking data as invalid.

Referring again to FIG. 2, the expert transport 250 provides access to all of the data storage mediums used for the various processes requiring the storage mediums. The communications between processing and storage elements is preferably network based to allow flexibility in implementation as the load of the subsystems may be distributed across machines if need be. Each module can access the expert transport in a very rigid manner making use of the object orientated design facilities provided by JAVA.

Figure 10:
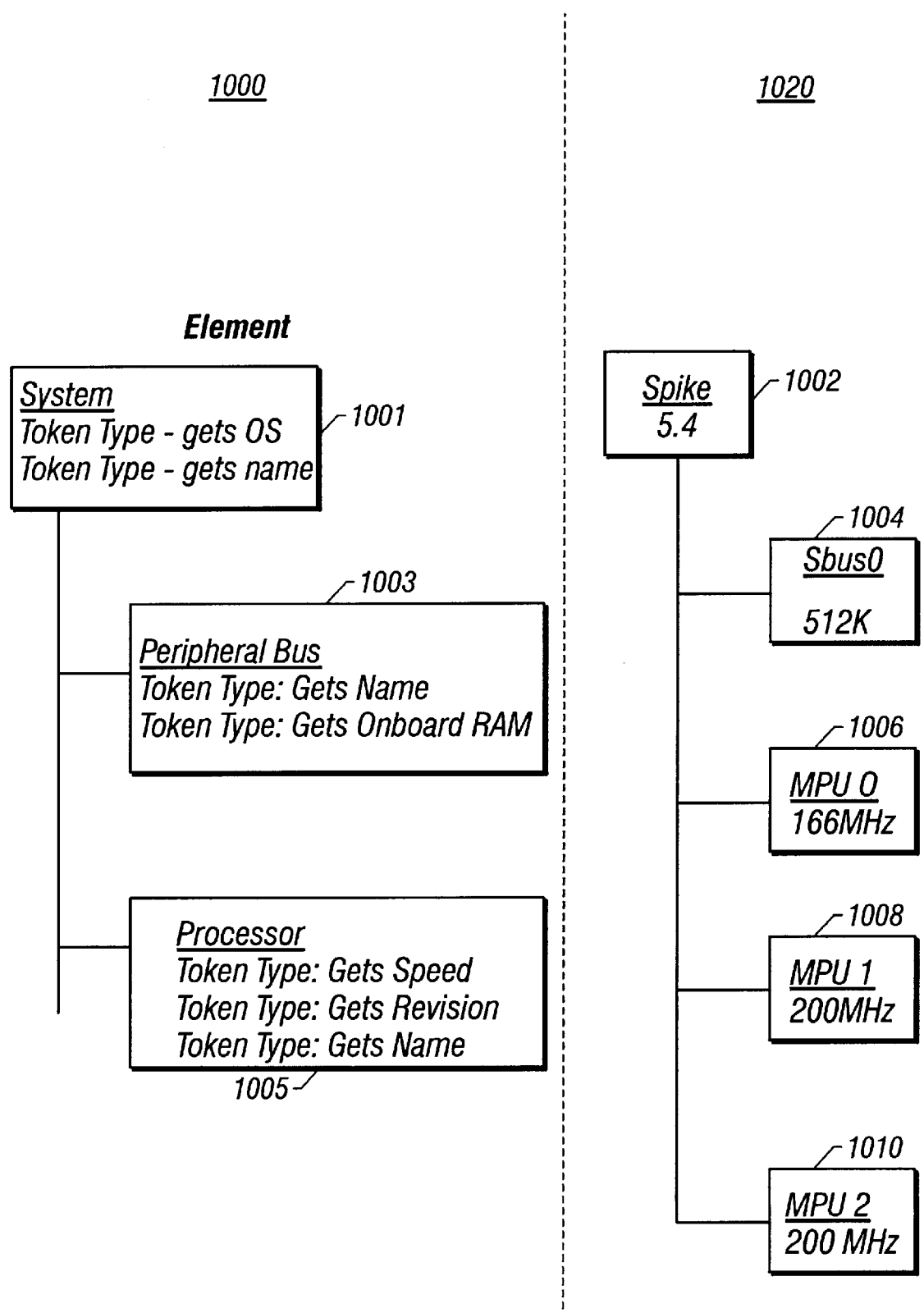
FIG. 10 shows another example of a tree structure and an instantiation of that tree.

A second example of building a host state is shown in FIG. 10. Element 1001 has associated token types for the name of the system and the operating system. Peripheral bus element 1003 has associated token types which gets the name of the peripheral bus and any onboard RAM. Element 1005, which is a processor element, has associated token types to provide a name, a revision number and the processor speed. The static definition 1000 creates a host state 1020 where the system is realized as "Spike" with an OS release of 5.4. The peripheral bus is instantiated as SBUS0 with 512 K of RAM. The processor element is instantiated three times as MPU0 1006, MPU1 1008 and MPU2 1010. Thus, an example is provided where a single element is realized more than one time in a particular system.

Figure 11:
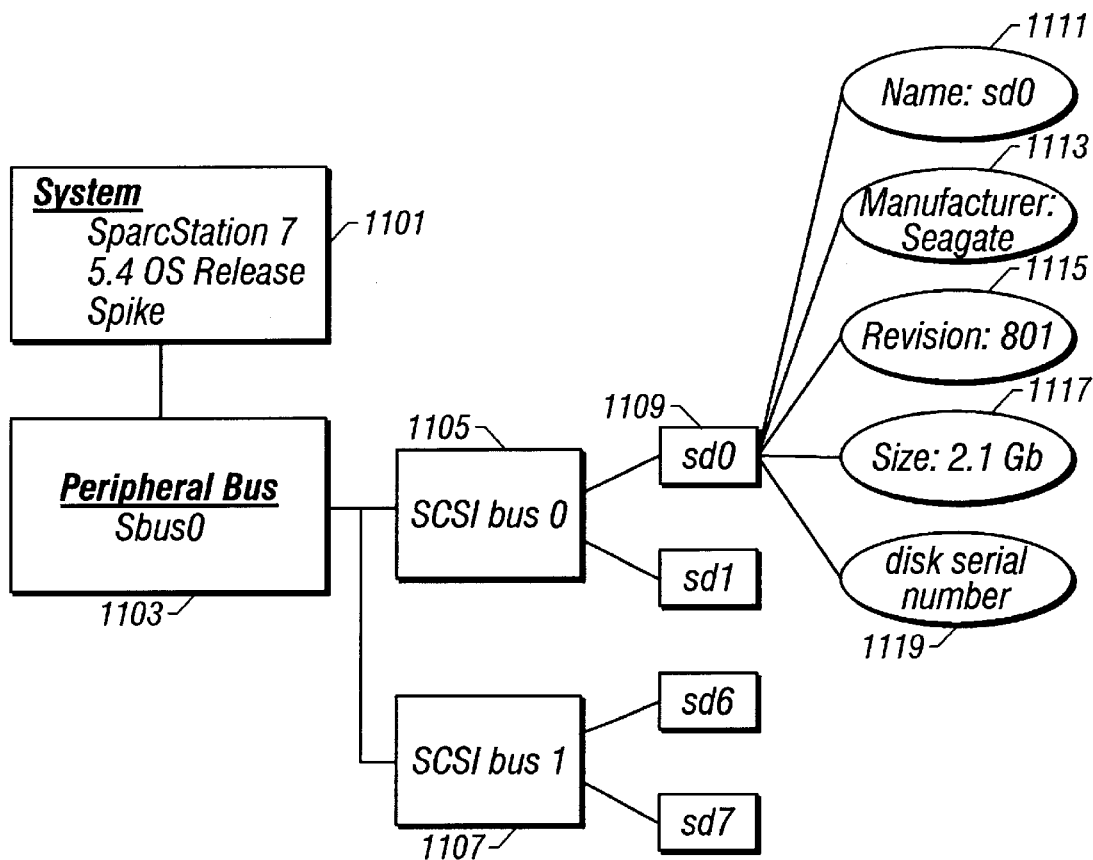
FIG. 11 shows another example of a host state.

Referring to FIG. 11, another example of a host state is provided. The system is shown as element 1101 with associated values of being SPARCstation7, with a system name Spike and an OS 5.4 release. All SPARC trademarks are used under license and are trademarks or registered trademarks of SPARC International, Inc., in the United States and other countries. Products bearing SPARC trademarks are based upon an architecture developed by Sun Microsystems, Inc. The system has a peripheral bus, Sbus0, which has two SCSI buses 1105 and 1107. Attached on SCSI bus 0 are two disks sd0 and sd1. Disk "sd0" has associated tokens, in addition to its name, the manufacturer 1113, the revision 1115, the size of the disk, 1117 and the serial number 1119.

Figure 12:
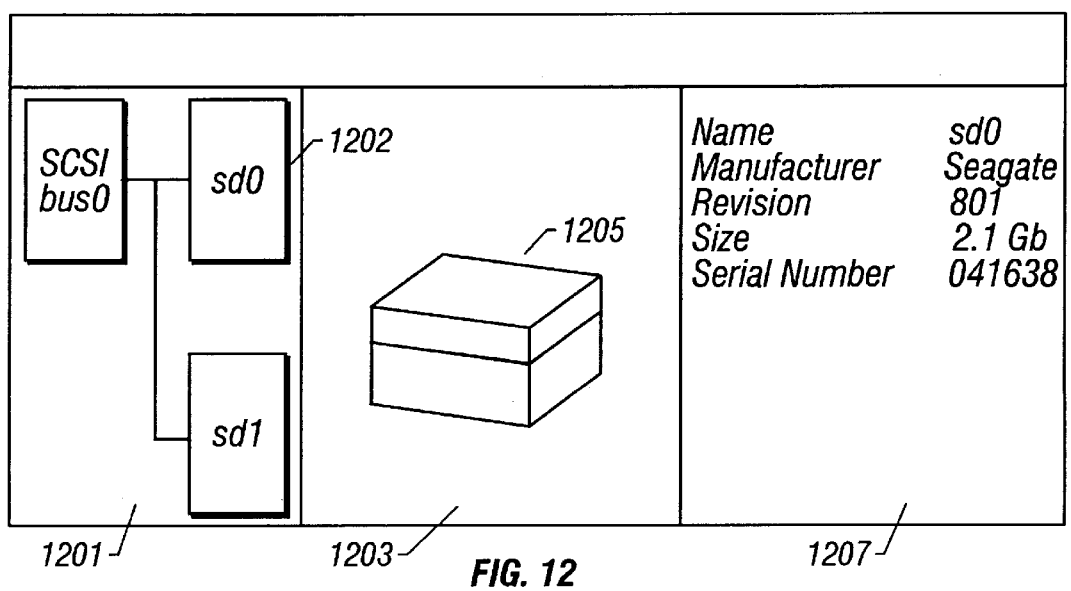
FIG. 12 shows how the host state can be displayed to show graphical, and attribute information about the host state.

In addition to storing the host state in data base 209, the system provides a graphical interface to access information about the host state. Referring to FIG. 12, an exemplary system visualization screen is shown. The tree structure is provided in region 1201 of the screen which graphically represents a portion of the host state shown in FIG. 11. Tree structures may also be represented in the form shown in FIGS. 7a–7e or other appropriate form. In addition to displaying the tree structure which provides the user a graphical depiction of the completed element hierarchy for a particular system at a particular time, the screen also provides a graphical image of the particular component which is being viewed. For instance, region 1203 of the screen shows a graphical image 1205 of a disk. Assuming that the viewer had clicked on disk 1202, sd0, region 1207 shows the attributes or token values associated with the selected element. Thus, the attributes relating to name, manufacturer, revision, size and serial number are all provided. This presents the support engineer with an easily understandable graphical image of the total system, and any particular component of the system that is represented in the host state, along with pertinent attributes.

Referring again to FIG. 2, the system visualizer 225 receives host states from host states database 209 and customer system information stored in data base 235. The system visualizer also receives alerts and local configurations relevant to a particular support engineer. One task of the system visualizer is to select the particular host that is to be worked upon or viewed. Thus, the system visualizer searches the host states database 209. The visualizer provides the ability to parse through time to select from all the host states available for a particular system. While each element may have a graphic associated with it, a separate graphic can be used to indicate that a problem exists with a particular element.

In addition to displaying the attributes of an element, which are the values of the tokens associated with the element, the system visualizer provides graphical capability to graph attributes against time. One or more attributes can be selected to be graphed against history. In other words, the same attributes from different instances of the element hierarchy for a particular system can be compared graphically. For example, the amount of disk free over time can be monitored by looking at outputs of the "df" test over a period of time. The df output includes such token values as disk percentage used for a particular partition, partition name and size of partition. The visualizer will extract the tokens representing amount of disk percentage used for a particular set of host states. The host states from which the disk percentage tokens are extracted is determined according to the time period to be viewed. That information can then be visualized by plotting a graph of disk percentage used against time. Also, the visualizer can view different instances of the host state. In other words, the visualizer can view the state of a monitored system at different times. That capability provides a visual interpretation of changes in system configuration. The visualizer accesses the stored multiple instances of the host state of the particular system to provide that capability.

While it is possible for the diagnostic data from the monitored system to come up to the monitoring system in a raw form, it is also possible to do some preprocessing on the data in the monitored system. The preprocessing may translate the diagnostic data to something more easily readable by the monitoring system. As a simple example, the monitored system may eliminate all white space in the test output. The choice of whether to do preprocessing may depend on such considerations as whether the additional load put on the monitored system is a cost that is outweighed by the benefit of simpler processing at the monitoring system.

Once host states have been created, the data can be analyzed for the presence of alerts. Alerts are predefined conditions in the various components of the monitored computer system that indicate operating conditions within the system. The alerts are designed to be sufficiently flexible so that they can detect not only serious problems, but also detect performance and misconfiguration problems. Different levels of severity may be provided in each alert. For example, alert severity can range from one to six. Severity level six indicates effectively that the system has gone down while a severity level of one indicates that there may be a performance problem in the system.

Two types of alerts may be available. The first kind of alert is a spot alert which is based on current data only. A spot alert indicates that a particular value of a system component has exceeded a threshold value. For example, a spot alert may result when the number of parity errors exceeds a predetermined threshold, or when the root partition of a disk exceeds 99%. A patch configuration problem provides another example of a spot alert. For example, assume the patch configuration problem exists for a particular patch in a particular OS release. If a host state contains the token indicating the presence of the particular patch as well as the token indicating the particular OS release, an alert is issued.

The second type of alert is a predictive alert. A predictive alert analyzes historical and current data to identify trends. In other words, the predictive alert is a form of trend analysis. Storing multiple instances of stored host states in the host state data base, makes possible such trend analysis of the operating conditions of a monitored system. Trend analysis allows pro-active detection of undesirable conditions in the collected diagnostic data. For example, trend analysis identifies that the number of memory parity errors is increasing, even though the number is not yet fatal. The alert can generate the probability that the increase will eventually result in a fatal error. Another example of a predictive alert is memory leak detection.

Trend analysis compares the value of a current alert to previous alert results. The trend is determined by comparing, e.g., tokens containing the number of parity errors of a memory element, over a sequence of host states. Trend analysis may use alerts saved from a previous analysis or may obtain relevant token values from saved host states or may operate on both saved tokens from earlier host states as well as saved alert values.

Note that trend analysis may be utilized to detect a build up of data indicating an increasing number of parity errors over a period of time and can flag the problem before the spot alert was generated. Similarly, the trend analysis can detect increasing disk usage and predict the problem before the threshold of 99% is reached. It can be seen that trend analysis is really analysis performed on the results of spot alerts over time.

A spot alert provides the basic analysis type. The spot alert allows components to be tested against alert types stored in database 243. Alert types define an alert in a manner similar to a token type defining a token. The alert types define the details of the alert and how to process it. Consider an alert to determine if a particular partition has exceeded a predetermined percentage used. The tokens utilized in processing the alert include a token for the partition name, e.g.,/var. A second token utilized is partition percentage used. The alert determines if partition name=/var AND percentage used ≧80%. When those two conditions are true, the alert is raised. That is a simple spot alert.

As an example of a predictive alert consider an alert that predicts whether or not swap space is going to get low on the system. The token value used is one that identifies swap-space used. An operator that is useful in predictive analysis is one called, OverTimeOperator, that provides the value of swap spaced used over time, i.e., from sequential host states. One can specify how far back the OverTimeOperator should go in retrieving token values from previous host states. The spot test of such a token determines if in the latest data, the swap spaced used is over 90%. That is the first gating factor of the alert. Then the alert uses that spot test data and the data from the OverTimeOperator and provides the data to a normalization function which provides a graphical analysis of the data. If the angle of normalization is greater than 52 degrees, an alert is generated thereby predicting that swap space is going to get low on the system. The particular angle selected as a trigger may depend on such factors as the system being monitored and the normalization function.

An exemplary alert definition is shown below which detects a probable swap space problem. In the example, the "OverTimeOperator" retrieves the swap spaced used tokens for the last 48 hours. The swap space used tokens are retrieved into var1 which is a vector or list of all swap spaced used tokens. Var2 is a vector of vectors which includes var1. Var2 is provided because in one embodiment, the compare operator may operate on more than two things. The result determines if swap spaced used tokens have been greater than 90% over the last 48 hours.

Vector var1=OverTimeOperator.dbGet ("token:Swap Used", currentTime, current Time−48*3600);
//input for var2
Vector var2input0=new Vector( );
var2input0.addElement (var1);
Integer var2=((Integer) var2Input0);
Integer var0=new Integer ("constant:int 90);
AlertRes res=GreaterThanOperator.compare (var2, var0);
In one embodiment, the alert definitions are run against the host states using alert functions. The code for each alert definition is not actually stored in the Alert function. Instead, the Java language code for the alert definition is sent by the alert editor to a file repository, e.g., alert types 243 from the compiler. A reference to the compiled alert definition is then stored in the Alert Function which is stored in a database, e.g. database 109 as shown in FIG. 1. An exemplary Alert-Function class is shown below.

```
Class AlertFunction
{
    String AlertFunction        // reference to actual javacode
    String Name;
    Vector CustomersApplicable; // vector of customers Alert
                                // function is run on. If
                                // Empty run on all
    Weight wgt;                 // tells it what the values
                                // of the function output mean
}
```

Thus, an Alertfunction object will exist for each alert definition, the object pointing to the location where the alert definition actually is stored. The Alertfunction object will be run against the host state (or states) as appropriate.

In one embodiment, there are five possible output levels of severity, red, yellow, blue, black, green. Weight creates a range mapping onto some or all of these severitys. For instance, if a particular alert returns a number between 1 and 100, a level of between 1 and 20 may be mapped onto red. Similarly, for an alert that returns a value of true or false, a true value can be mapped onto, e.g., red. For each new host state, the alert processor retrieves all of the alert functions. Each alert function points to the associated compiled alert code and in this way all of the alert definitions are parsed against the host state.

When alerts are created, that is when the alert definitions pointed to by the alert functions, are found to exist in a particular host state(s), then an alert object in accordance with an alert class is created. An exemplary alert class is as follows:

```
public class Alert
extends NamedObject
implements Cloneable, Persistence, DatabaseDefinition {
Alert Status    status;              // red,blue,green,yellow
ElemementDef    elementDef;          // eg disk, cpu
Element         element;             // instance of element
AlertFunction   function;            // the function that compute this
                                     // alert, eg check swap space
boolean         isHandled;           // anyone acknowledged it?
ExpertUser      user;                // who acknowledged it
String          soNumber;            // service order # if one was
                                     // logged by RX
String          date;
String          description;         // human readable description,
                                     // filled in from a printf type
                                     // template
Customer        customer_id;         // uniquely identifies customer site
String          customerOrgName;     // company etc
String          customerSite;        // company etc
CustomerHost    customerHost;        // the specific host
String          customerContact;     // name of a person, usually a
                                     // sys admin
String          customerPhoneNo;     // that person's phone number
int severity;                        // severity level
}
```

Each of the fields above are filled in by either the output value of the AlertFunction or information relevant to the customer that is obtained from the incoming diagnostic data.

Alert types use the element hierarchy as their base and can be tied to the tree definition for visualization purposes. For instance, if an alert is generated for a disk capacity of a partition, the alert visualizer would graphically represent the partition to facilitate ease of understanding for the service engineer.

In a preferred embodiment, alert definitions are processed on each host state after it is generated. Each alert type is compared to a host state and an output is generated. That is, the tokens contained in the host state are compared to the condition defined in the alert type. An alert editor 221 allows alert types to be defined through an editor. An alert, which is an instantiation of a particular alert type, can have an associated severity level as previously described.

An alert may based on other alerts. That is, an alert type can take either the input from one or more token types or a mixture of other alerts and token types. Therefore a complex alert structure can created before a final alert value is determined. An alert editor 221 provides the ability to create alert types. The alert editor can create the code to represent the alerts. If the alert type is a fairly rigid structure, the creation of code is facilitated.

The alert types are related to the element hierarchy. The alert type to test the disk capacity of a partition, as described previously, utilizes tokens related to the partition element in the element hierarchy. That alert works fine for all partitions. In accordance with the model discussed in the element and element hierarchy, only one alert would exist for all partitions created, so all partitions that exist on all disks would have the alert processed when a host state is created.

The alert types, as can be seen from the description of alerts herein, support basic logic tests. As another example, consider an overall test of virtual memory. That may require a disk space alert run on the /tmp partition. For example, assume there is a /tmp disk space alert, that is defined upon the global partition. Such an alert type has a logic test to see if the attached token parameter is equal to "Amp".

There are various operators which are utilized to define the alerts. The operators are in the general sense functions that operate on the token types contained in the host states. Exemplary operators include logical operators, AND, OR, NOT, XOR, BIT-AND, BIT-OR, BIT-NOT, BIT-XOR, arithmetic operators, SUM SUBTRACT, MULTIPLY, DIVIDE, relational operators, LESS THAN, LESS THAN OR EQUAL, GREATER THAN, GREATER THAN OR EQUAL, EQUALS, NOT EQUALS. There are also set operators, UNION, INTERSECTION, ELEMENT OF, (element of is checking if the particular value is an element of a set), DIFFERENCE BETWEEN 2 SETS. String operators include, STRING LENGTH, STRING-SUBSTRING (to see if the string you have is actually a substring of the original string), STRING-TOKEN, (to see if this particular string is a token of the bigger string). Conversion operators convert, HEXADECIMAL TO DECIMAL, HEXADECIMAL TO OCTAL, HEXADECIMAL TO BINARY. Additional operators are, AVERAGE, MEAN, STANDARD DEVIATION, PERCENTAGE CHANGE, SLOPE (which is based on graphing a straight line interpolation of plots), SECOND ORDER SLOPE, CURVE EXPONENT (map an exponent algorithm on the actual curve), MAX, and MIN, for the maximum and minimum value, ALL OF TYPE (extracts all the values of a certain type out of a host state), ALL OVER TIME (obtains a range of data for a token over a period of time), EXIST, (checks to see if token exists), WEIGHT, (applies a certain weight to a value), NORMALIZE. Some embodiments may also provide for custom operators. Other operators may be utilized in addition to or in place of those described above.

Once the alerts have been defined and stored in alert types database 243, the alerts have to be run against the host states.

Whenever a host state is created the alert and trend analysis is run against the host state. Thus, the alert types and a host state are provided to analyzer 223. The analyzer processes the alerts by running the code definition of the alerts against the host state(s). The alert types may be associated with particular elements so that an entire tree structure does not have to be searched for each alert type. If an alert is generated, alerts data base 239 stores the value of the alert. Storing the alerts in a database allows for later retrieval.

Alerts can focus on several major areas of a system operations. Typical areas of interest include patch management, performance monitoring, hardware revision, resource maintenance, software problems, general configurations and hardware failures. Patch management alerts detect if patches are missing on systems that require the patch to correct known hardware or software problems. Performance monitoring and system configuration alerts ensure that the system is configured appropriately to maximize performance. Hardware revision alerts detect when hardware is out of date or a known problem exists with a particular hardware revision. Resource maintenance, e.g., alerts related to swap space, identify when a resource is going to or has run low. Software failure alerts identify known symptoms of software failures. General configuration errors identify system configuration errors that can adversely affect system performance. In addition, hardware failures are also an area of focus for alerts.

In one embodiment of the invention, all alert types are global in that the alert types are run against all monitored systems, i.e., the host state representation of that system, in a default mode. However, the tests can be can be selectively enabled (or disabled) according to the monitored system. Such capability is provided in the embodiment shown in customer alert configurer 231 which, in a preferred embodiment, is a Java programming environment based graphical user interface (GUI) which provides the ability to select which alerts should run on particular monitored systems from a list of all the alerts available. Note that it is not essential that each system being monitored have the alerts match their actual hardware and software configuration. If an alert has no input the alert will be marked as invalid. Consider, for example, a disk mirroring alert. If the host state does not show that any disk mirroring exists on the host, then the disk mirroring alert is invalid and ignored by the system. Thus, alerts that reference elements or token parameters not found in a particular host state are marked as invalid and ignored Note that the design of the alert system is intended to mirror the thought process of a support engineer. That is, when presented a problem, a number of system conditions is checked for existence or correctness, a weighted judgment is given after each investigation, eventually the final prognosis is given.

In addition to generating the alerts, the existence of the alerts is communicated to, e.g., a support engineer. Referring to FIG. 2, several features are provided to support the engineer responsible for a particular monitored system. For instance, in order to provide the information to a support engineer, one embodiment of the invention utilizes a Graphical Users Interface (GUI) application implemented in the Java programming environment to display the alerts in alert display 245. In this embodiment the GUI provides the support engineer with a number options for displaying alerts. For example, the GUI, in one embodiment, displays a list of all alerts that have arisen and have not been dealt with. The GUI may also provide the capability to perform various operations on a list of alerts, such as to filter the list by priority, customer and type of alert. The GUI can allow the engineer to focus on certain customers, ignoring others. The GUI uses personal configurations for the engineer that have been created rough the configuration editor to access this functionality.

A configuration editor 227 stores engineer specific information about the system visualizer and the alert viewer. The configuration editor allows configuration of various aspects, such as which other remote monitoring sites (e.g., in other countries) the visualizer and alert viewer are to communicate with, as well as which monitored computer systems the engineer is responsible for. The configuration editor will also allow the engineer to define which applications start up by default.

The alert viewer can thus provide a scrolling list of alerts for customers specified by the local configuration file. The alert viewer displays such information as alert priority, customer name, alert type, host machine; time passed since alert raised. Color may also be used to distinguish varying levels of alert importance.

The support engineer also has a background task operating, the expert watch 241, which in a UNIX embodiment is a daemon process that runs on the engineer's machine. Expert watch 241 monitors incoming alerts generated in alert analyzer and trend analysis block 223 and when the expert watch 241 matches an alert type and customer with the configuration profile of the engineer, it will notify the engineer and cause the system visualizer display the problem system at the point in the hierarchy where the problem exists. The problem can then be shown graphically. If the system visualizer was not running, the expert watch daemon may cause the system visualizer to start.

Alerts can be generated in another fashion other than the alert analyzer 223, specifically, phone home processing. Phone home processing is when a serious problem occurs on a monitored system requiring immediate attention, and the monitored system immediately contacts the service center via, e.g., dial up modem or email. Phone home processing 249 converts the incoming phone home messages into alerts. The alerts are then dealt as high priority alerts through the system. The alerts can be viewed by the alert viewer and/or emails are sent to the appropriate email addresses.

In addition to notifying service engineers by displaying alerts, the alert processing in 247 may also generate email. A database such as database 107 shown in FIG. 1 may include email addresses associated with particular monitored systems. When an alert of a predetermined seriousness occurs, an email may be sent to the appropriate email addresses or the particular monitored system is communicated with via alternative communication channels, e.g., wireless.

Once the alert types have been run against a particular host state, an alert indicating a serious problem may result. The severity of a particular alert can be determined when the alert is defined. For example, in one embodiment, an alert, which is an instantiation of a particular alert type, has output severity levels of red, yellow, blue, black, green, with red being the most serious.

For alerts which are determined to be serious, e.g., for red alerts, it is typical to want to correct the problem causing the red alert as expeditiously as possible. Thus, when the monitoring system is expected to provide support for its customers, and particularly 24 hour support, the more information regarding the problem and its solution that can be provided to the responsible engineer at any particular time of the day, the more likely that that engineer can find a resolution to the problem. This can be seen to be particularly important when the alert is a red alert since resolving the problem may avoid or minimize a critical failure in the monitored system. A monitoring computer system according to one embodiment of the present invention, therefore provides the engineer a variety of available information to assist the engineer in determining a solution to whatever problem has arisen.

In order to assist the support engineer, known problems and resolutions are stored in a systems resolution database which can be in database storage 123 (FIG. 1). For example, the systems resolution data base might include such information that a failure associated with a specific disk drive in a particular computer system can be fixed by a software patch. Thus, the data base would include an entry for that specific disk drive along with the software patch as well as a textual description of the problem and its solution. Data base 123 typically is a relational data base. For particularly serious alerts or red alerts a cross referencing system to the systems resolution data base is used to increase the information available to the support engineer.

The systems resolution data base has "system resolution" type documents prepared by engineering support staff to help solve common problems. The documents include a textual description of the problem and likely resolutions. In other words, the data base contains a description of what to check for in terms of possible causes of the problem in order to try to resolve the problem. When alerts are created the alert editor 221 can include a special function such that every time an alert is generated, a part of the alert editor prompts the creator of the alert to provide a textual problem description and potential solutions if the written description of the problem is not available from the existing systems resolution data base. Note that a solution may be identified before or after a particular alert is created.

When the alert is created that is of a specified severity, such as a red alert, the system can search the systems resolution data base for anything that matches the keywords specified in the alert name. If the systems resolution data base contains information applicable to help solve the problem identified by the alert, a link is placed between the alert and the location(s) in the systems resolution data base. If there is no information or insufficient information in the systems resolution data base, the creator of the alert is prompted to provide a short solution to the problem, in textual terms which can then be stored in the systems resolution data base. The textual description indicates to the support engineer what aspects of the system should be checked to try to resolve the particular problem, in other words, what is most likely to be the cause and solution. Preferably, the description views the problem from the end users point of view, that is, the support engineer. Thus, in the ideal case, when a problem occurs, the textual information tells the support engineer what to do to fix the problem.

In addition, database 123 stores profile information about each customer. For instance, the data base stores information including the hardware and software configuration for each customer, customer name, responsible service engineer, email addresses. Data base 123 in FIG. 1 is intended to represent as many relational data bases as necessary to provide the relational data bases described herein. Thus, the profile data base and the customer resolution data base described herein are typically different data bases and have no necessary physical or logical relation to one another.

Figure 13:
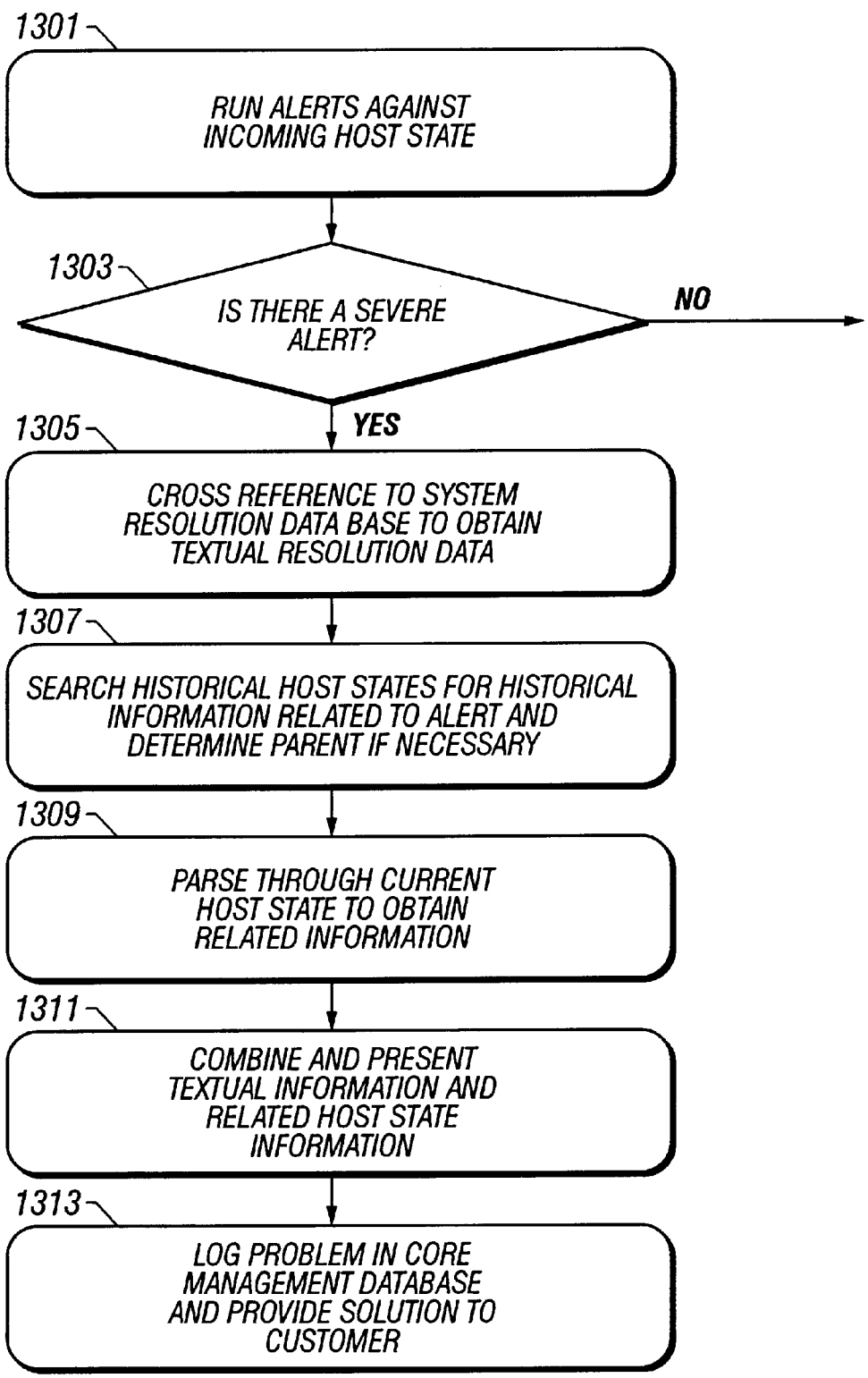
FIG. 13 shows a flowchart illustrating one embodiment of the present invention.

Referring to FIG. 13, a system according to the present invention functions as follows. Alerts are run against the incoming host state in 1301. When an alert condition is detected, if there is a severe alert detected in 1303, textual information in the alert, for instance, keywords such as "swap spaced used" is auto-cross-referenced against the systems resolution database of known problems and resolutions in step 1305. In addition, information relating to known problems and resolutions may be cross-referenced against the known history and status of the system being monitored. Known history and status may be obtained by extracting relevant information from prior host states in 1307. Historical information for the system being monitored allows the support engineer to know if the problem is a repeat problem.

Where necessary, a parent of a particular token is identified as explained more fully herein. The relevant information from the current host state is obtained in step 1309. The information from the systems resolution data base and the related host state information, both current and historical, are combined and presented to the support engineer in 1311. The state of the rest of the system is then investigated and the customer is provided a notification of the problem and the solution in step 1313. This can be accomplished by logging a service order into a call management system, which contacts an administrator of the monitored system, e.g., via the email address contained in the profile data base. The administrator is provided a description of the problem and the appropriate solution based on the textual information and the solution contained in the systems resolution data base and the analysis by the support engineer.

The approach described herein exploits the fact that the alert is reasonably knowledge rich anyway in the sense that the alert essentially knows why it has created itself from the algorithm defining the alert. For instance, the alert knows the input data that has come in, which are in the form of tokens. That knowledge is provided to the support engineer to help resolve the problem.

An exemplary red alert processing according to the present invention is described in the following example. Assume that a monitored system, which has a number of hard disks, is not seeing one of its disks for some reason. Assume also that an alert exists that effectively monitors the disks that are attached to the machine and if one disk goes missing, the alert recognizes that fact. That can be detected, for example, by comparing the present disks detected to the disks detected in a previous host state, i.e. a previous time slice. The problem with the disk may originate from a number of sources. For example, it may be that somebody has unplugged it, or more likely, the disk controller is faulty or a disk is completely dead. Assume also that the alert which "fires" is a red alert. A process in alert processing 247 retrieves textual information related to problem resolution that was provided by the creator of the red alert or that came from the problem resolution data base. The systems resolution data base 123 is searched based on parameters of the red alert, such as the name of the alert, to see if there are any entries in the systems resolution data base that are related to the problem identified by the red alert. In addition, the alert processing 247 then retrieves information from the host state that is related to the problem based on information in the systems resolution data base 123. Related information includes information that is related to the problem in the sense that it is related on the tree. For example, referring to FIG. 5, information related to fixed media device 511, e.g., a hard disk, may include the peripheral adapter 503, peripheral bus 309 and host 301.

The way the host state data structure is held in a preferred embodiment, is in regular expression and thus is searchable. If a token is missing such as would be the case if the disk is missing, then step 1307 (FIG. 13) can find the missing token by going back in time (to a prior host state) when the disk was there and the parent of that disk can be determined. Then the processing can return to the current host state and search backwards from the parent. Because the tree structure is an inverted tree type structure, the tree can be parsed back up by following the links returning each particular piece of information about each element in the tree all the way to the top. The related information is returned because there is a possibility that if something has gone wrong with the disk, there might be something wrong with the controller or the bus coupling the disk controller to the host and so relevant information is extracted from the tree and provided to the support engineer. Such information may be required to follow the textual description for trouble shooting the particular problem.

Therefore it is possible to traverse up the tree from the spot where the missing disk was supposed to be located. Where the disk failed for another reason, e.g., the number of soft errors exceeded a threshold, rather than going missing, it is not necessary to use previous host states to determine the appropriate location in the tree from which to traverse back towards the root. Once the information from the tree is retrieved, that information, along with the textual information from the systems resolution data base can be combined, e.g., into a text file and provided to the support engineer. In addition, the information containing the textual information and the tree information can be logged into a data base used by support engineers to track problems.

Another example of a red alert processing relates to memory leaks. Assume that a kernel exists, e.g., in the UNIX operating system, whose function includes monitoring of the hardware devices such as the terminal, mouse, keyboard and other functions known in the art. It is common for kernel memory leaks develop, especially as the computer system on which the kernel is running gets heavily loaded. A memory leak occurs because memory that is allocated to a task remains unavailable to the rest of the system instead of being released back for use by other tasks. Therefore it is useful to have an alert that monitors for kernel memory leaks. The alert can be predictive because a slow increase of memory allocations occurs before the leak becomes critical. Thus, the alert can look at the memory allocation and also potentially the rate of memory allocation. When the memory allocation has reached a particular threshold in terms of memory allocated and/or rate of allocation, it is likely that there is going to be a critical problem soon.

If the same problem has occurred before and a patch has been determined to be a solution for that problem, that patch resides in the systems resolution database. The red alert goes through the same procedure described previously with relation to FIG. 13. That is, when the alert is detected, indicating that the monitored system has been leaking memory and is going to run out of memory soon, the alert processing looks up the textual information in the systems resource data base, and extracts the textual information related to the problem. The textual information describes the problem and appropriate items to check for in resolving the problem and provides any known resolutions to the problem, such as software patches. An indication of the solution may include a special field that indicates whether or not there is patch for this particular problem.

If a patch exists for the problem, then the patch or other solution is automatically registered with the system to send a copy of the patch to the customer, preferably immediately. The patch is then copied back up to the customer, and an E-mail is generated indicating to the customer that the patch or other solution has arrived and the solution needs to be implemented as soon as possible.

The description of the invention set forth herein is illustrative, and is not intended to limit the scope of the invention as set forth in the following claims. For instance, while exemplary tests were generally described in terms computers operating in a UNIX environment, the invention is also applicable to computer systems utilizing a variety of operating systems. Variations and modifications of the embodiments disclosed herein, may be made based on the description set forth herein, without departing from the scope and spirit of the invention as set forth in the following claims.

What is claimed is:

1. A method of monitoring a monitored computer system, comprising:

determining if a condition exists in current state information stored in a first storage location in a monitoring computer system, the current state information indicating a state of hardware and software components and operating conditions of the monitored computer system during a first time period, and wherein the current state information is represented as a tree structure, the tree structure including component information which represents the hardware and software components and operating conditions of the monitored computer system, the component information being extracted from diagnostic data provided by the monitored computer system;

retrieving component information related to the condition from the current state information when the condition is determined to exist;

presenting the component information on a display device;

providing a third storage location storing previous state information relating to the monitored computer system, the previous state information being represented as another tree structure, representing a state of the monitored computer system during a second time period, the second time period being different from the first time period; and traversing the other tree structure to identify a missing component in the tree structure of the current state information and providing an indication of the missing component.

2. The method as recited in claim 1 further comprising:

retrieving resolution information relating to the condition from a second storage location in the monitoring computer system; and presenting the resolution information with the component information on the display device.

3. The method as recited in claim 2 wherein textual resolution information is stored in a data base in the second storage location.

4. The method as recited in claim 1 further comprising retrieving second component information related to the condition from the previous state information.

5. The method as recited in claim 4 further comprising displaying the second component information on a display device.

6. The method as recited in claim 1 further comprising traversing the tree structure of the current state information according to the indication of the missing component in order to extract the component information related to the condition from the tree structure of the current state information.

7. The method as recited in claim 1 further comprising determining whether the condition is of a predetermined severity.

* * * * *